US011738270B2

(12) United States Patent
Iwata et al.

(10) Patent No.: US 11,738,270 B2
(45) Date of Patent: Aug. 29, 2023

(54) SIMULATION SYSTEM, PROCESSING METHOD, AND INFORMATION STORAGE MEDIUM

(71) Applicant: BANDAI NAMCO Entertainment Inc., Tokyo (JP)

(72) Inventors: Eiji Iwata, Tokyo (JP); Nobuyuki Morishima, Fujisawa (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 376 days.

(21) Appl. No.: 16/987,480

(22) Filed: Aug. 7, 2020

(65) Prior Publication Data

US 2020/0368625 A1 Nov. 26, 2020

Related U.S. Application Data

(63) Continuation of application No. PCT/JP2019/002173, filed on Jan. 24, 2019.

(30) Foreign Application Priority Data

Feb. 8, 2018 (JP) .................................. 2018-020888

(51) Int. Cl.
*G06T 19/00* (2011.01)
*A63F 13/67* (2014.01)
(Continued)

(52) U.S. Cl.
CPC .............. *A63F 13/67* (2014.09); *A63F 13/40* (2014.09); *G06F 3/011* (2013.01); *G06T 19/006* (2013.01)

(58) Field of Classification Search
None
See application file for complete search history.

(56) References Cited

U.S. PATENT DOCUMENTS

| 2009/0215536 A1 | 8/2009 | Yee et al. |
| 2012/0229508 A1 | 9/2012 | Wigdor et al. |
| 2014/0002444 A1* | 1/2014 | Bennett ................. G06T 19/006 |
| | | 345/419 |

FOREIGN PATENT DOCUMENTS

| JP | 2005-157611 A | 6/2005 |
| JP | 2009-195707 A | 9/2009 |

(Continued)

OTHER PUBLICATIONS

International Search Report of the International Searching Authority dated Apr. 23, 2019 for the corresponding International application No. PCT/JP2019/002173 (and English translation).

*Primary Examiner* — Nicholas R Wilson
(74) *Attorney, Agent, or Firm* — Posz Law Group, PLC

(57) ABSTRACT

A simulation system including a processor, the processor performs an information acquisition process acquiring real space information obtainable by a recognition process of a real space and user information; a virtual space generation process generating a virtual space corresponding to the real space based on the real space information; an object process that sets a reference point in the virtual space based on the user information and the real space information, and disposes an object of a character in the virtual space based on the reference point; and a display process displaying an image including an image of the character. The object process sets a hit volume based on a position of a user moving body in the virtual space, and performs a process with respect to the character in accordance with a positional relationship between the hit volume and the character when the user performs a given input.

14 Claims, 25 Drawing Sheets

(51) Int. Cl.
*A63F 13/40* (2014.01)
*G06F 3/01* (2006.01)

(56) References Cited

FOREIGN PATENT DOCUMENTS

| | | |
|---|---|---|
| JP | 2011-210019 A | 10/2011 |
| JP | 2012-101026 A | 5/2012 |
| JP | 2014-515130 A | 6/2014 |

* cited by examiner

Elimination, destruction, display mode change

Falling sound

Notification process

SIMULATION SYSTEM, PROCESSING METHOD, AND INFORMATION STORAGE MEDIUM

CROSS REFERENCE TO RELATED APPLICATION

This application is a continuation of International Patent Application No. PCT/JP2019/002173, having an international filing date of Jan. 24, 2019, which designated the United States, the entirety of which is incorporated herein by reference. Japanese Patent Application No. 2018-020888 filed on Feb. 8, 2018 is also incorporated herein by reference in its entirety.

BACKGROUND

The disclosure relates to a simulation system, a processing method, an information storage medium, and the like.

Systems for enabling Mixed Reality (MR), Augmented Reality (AR), Virtual Reality (VR), and the like have previously been known. For example, Japanese Laid-Open Patent Publication No. 2005-157611 discloses an image processing device capable of displaying a synthetic image by combining a real space image observed from a point-of-view position of a user with an image of a virtual object observed from a point-of-view position of the user. This image processing device specifies a real space area by an operation of a user, produces a virtual object based on the specified real space area, and combines the produced virtual object with the observed real space image.

Although the MR and AR systems, such as those disclosed in Japanese Laid-Open Patent Publication No. 2005-157611, made it possible to combine a real space image with a virtual space image, favorable interaction between a character as a virtual space image and a user in a real space has not successfully been achieved. In addition, disposing a dedicated marker in the real space to enable the character to appear has also been problematic. Moreover, in the previously-known systems, information of the real space was not effectively utilized in order to cause the appearance of the characters and the like.

DESCRIPTION OF EXEMPLARY EMBODIMENTS

Figure 1:
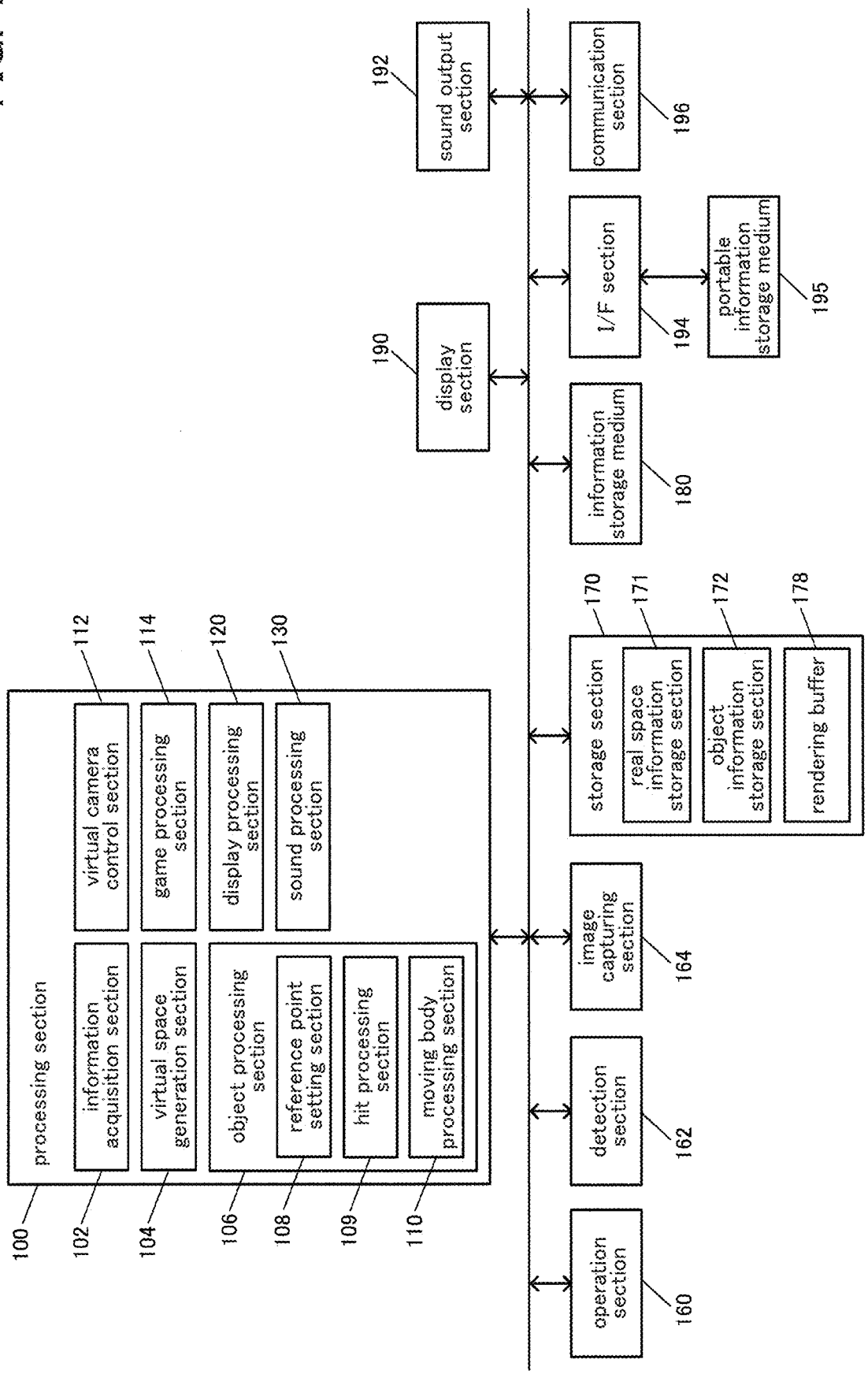
FIG. 1 is a block diagram illustrating a configuration example of a simulation system according to the present embodiment.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Exemplary embodiments are described below. Note that the following exemplary embodiments do not in any way limit the scope of the content defined by the claims laid out herein. Note also that all of the elements described in the present embodiment should not necessarily be taken as essential elements.

1. Simulation System

FIG. 1 is a block diagram illustrating a configuration example of a simulation system (a simulator, a game system, an image generation system) according to the present embodiment. The simulation system according to the present embodiment is a system that enables MR (Mixed Reality), AR (Augmented Reality) and the like, and can be applied to various systems such as a game system providing game content. The simulation system according to the present embodiment is not limited to the configuration illustrated in FIG. 1, and can be modified in various ways including omitting some of its components (sections) or adding another component.

An operation section 160 is used by a user (player) to input various types of operation information (input information). The operation section 160 can be implemented by various operation devices such as an operation button, a direction designating key, a joystick, a handle, a pedal, a lever, and a voice input device, for example.

A detection section 162 detects a movement of a user, and can be implemented using an acceleration sensor, a gyro sensor and like motion sensors. For example, the detection section 162 is attached to, for example, a body part of the user, and detects a movement of the part of the user or the like. For example, a change in acceleration or the like when a body part of the user moves is detected by a motion sensor such as an acceleration sensor to thereby detect a movement of the user. Alternatively, a camera may be used to detect the motions of the user. For example, a leap motion sensor that detects a movement of a fingertip or the like with two infrared LEDs and two cameras (stereo cameras) may be used. Alternatively, the movement of a user may be detected by posture detection using Kinect (registered trademark).

The image capturing section 164 (camera) captures an image of a subject, and is implemented by an image sensor such as a CCD or a CMOS sensor, and an optical system constituted of a focus lens or the like. The image capturing section 164 may be a depth camera implemented by an infrared camera or the like. For example, it may be arranged such that a light coding method in which an IR projector that projects an infrared pattern is provided in the image capturing section 164, the projected infrared pattern is read by an infrared camera, and depth information is acquired from distortion of the pattern.

A storage section 170 stores therein various types of information. The storage section 170 functions as a work area for a processing section 100, a communication section 196, and the like. The storage section 170 stores a game program and game data required for executing the game program. The function of the storage section 170 can be implemented by a semiconductor memory (dynamic random access memory (DRAM), video random access memory (VRAM)), a hard disk drive (HDD), a solid state drive (SSD), an optical disc device, or the like. The storage section 170 includes a real space information storage section 171, an object information storage section 172, and a rendering buffer 178.

An information storage medium 180 (computer-readable medium) stores a program, data, and the like. The function of the information storage medium 180 can be implemented by an optical disc (a digital versatile disc (DVD), a Blu-ray disc (BD), a compact disc (CD)), an HDD, a semiconductor memory (read only memory (ROM)), and the like. The processing section 100 performs various processes according to the present embodiment based on a program (data) stored in the information storage medium 180. Thus, the information storage medium 180 stores therein a program for causing a computer (a device including an input device, a processing section, a storage section, and an output section) to function as the sections according to the present embodiment (a program for causing a computer to perform processes of the sections).

A display section 190 outputs an image generated according to the present embodiment, and can be implemented by an LCD, an organic electroluminescence display, a CRT, or the like. The display section 190 is, for example, a display (display device) of an HMD 200 (head mounted display) shown in FIGS. 2 and 3 described later. A sound output section 192 outputs sound generated according to the present embodiment, and the function thereof can be implemented by a speaker, a headphone, or the like.

An interface (I/F) section 194 performs an interface process for a portable information storage medium 195. The function of the I/F section 194 can be implemented by an application specific integrated circuit (ASIC) or the like for the I/F process. The portable information storage medium 195 is a storage device that stores various types of information from the user, and holds the information without power supply. The portable information storage medium 195 can be implemented by an integrated circuit (IC) card (memory card), a universal serial bus (USB) memory, a magnetic card, or the like.

A communication section 196 communicates with external apparatuses (other devices) through a wired or wireless network. The function of the communication section 196 can be implemented by a communication ASIC, hardware such as a communication processor, or a communication firmware.

The program (data) for causing a computer to function as the sections according to the present embodiment may be distributed to the information storage medium 180 (or the storage section 170) from an information storage medium of a server (host device) through a network and the communication section 196. The scope of the present disclosure can include such a configuration where the information storage medium of the server (host device) is used.

Figure 2:
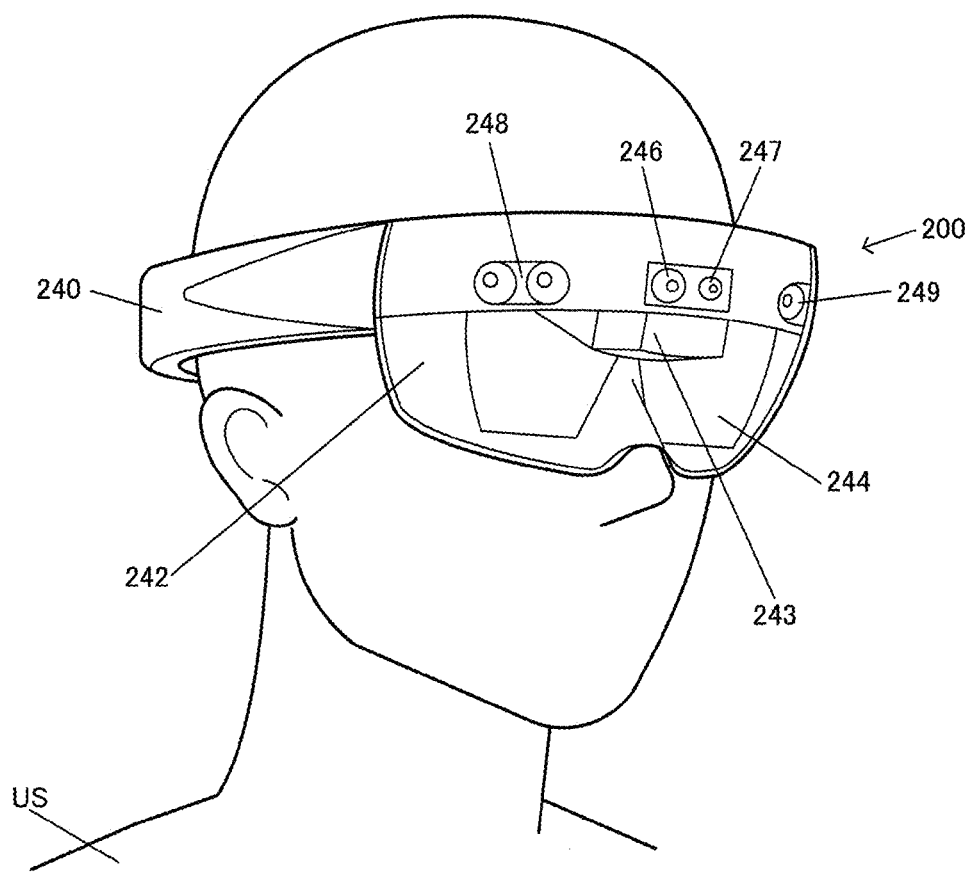
FIG. 2 illustrates an example of an HMD used in the present embodiment.
Figure 3:
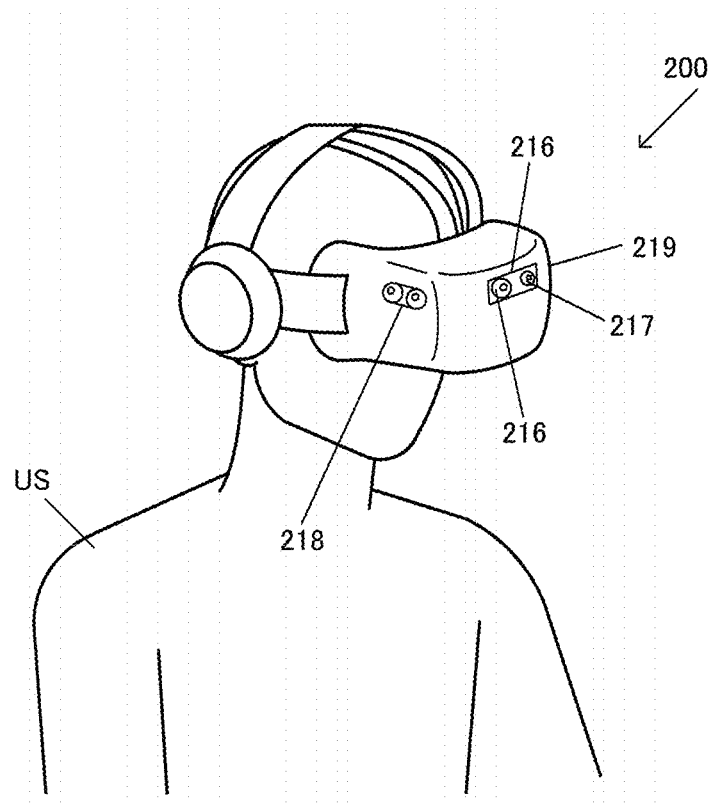
FIG. 3 illustrates an example of an HMD used in the present embodiment.

The processing section 100 (processor) performs an information acquisition process, a virtual space generation process, an object process, a virtual camera control process, a game process (simulation process), a display process, or a sound process based on operation information from the operation section 160, tracking information on the HMD 200 (information on at least one of the position and direction of the HMD, information on at least one of the point-of-view position and line-of-sight direction) of FIGS. 2 and 3, a program, and the like.

The processes (functions) according to the present embodiment performed by sections of the processing section 100 can be implemented by a processor (processor including hardware). For example, the processes according to the present embodiment can be implemented by a processor that operates based on information such as a program and a memory that stores the information such as the program. For example, the processor may implement the functions of the sections in discrete hardware or in integrated hardware. For example, the processor may include hardware, and the hardware may include at least one of a circuit that processes a digital signal and a circuit that processes an analog signal.

For example, the processor may include one or a plurality of circuit devices (such as an IC) or one or a plurality of circuit elements (such as a resistor or a capacitor) mounted on a circuit board. For example, the processor may be a central processing unit (CPU). However, the processor is not limited to the CPU, and various processors such as a graphics processing unit (GPU) or a digital signal processor (DSP) may be used. The processor may be a hardware circuit such as an ASIC. The processor may include an amplifier circuit, a filter circuit, or the like that processes an analog signal. The memory (storage section 170) may be a semiconductor memory such as a SRAM or DRAM, or may be a register. Furthermore, the memory may be a magnetic storage device such as a hard disk device (HDD) or may be an optical storage device such as an optical disc device. For example, the memory stores therein a computer-readable command, and the processes (functions) of the sections of the processing section 100 are implemented with the processor executing the command. This command may be a set of commands forming a program, or may be a command for instructing an operation to a hardware circuit of the processor.

The processing section 100 includes an information acquisition section 102, a virtual space generation section 104, an object processing section 106, a virtual camera control section 112, a game processing section 114, a display processing section 120, and a sound processing section 130. As described above, the processes according to the present embodiment performed by these sections may be implemented by a processor (or a processor and a memory). Various modifications may be made with some of these components (sections) omitted, or another component added.

The information acquisition section 102 acquires various types of information. The virtual space generation section 104 performs a virtual space generation process. The object processing section 106 performs various processing of the object of the character and the disposed object. The details of the information acquisition section 102, the virtual space generation section 104, and the object processing section 106 are described later.

The virtual camera control section 112 (a program module for a virtual camera control process) controls a virtual camera. For example, the virtual camera is controlled by a process based on the operation information that is input by the user using the operation section 160, the tracking information, and the like. For example, the virtual camera control section 112 controls the virtual camera set as a first person point-of-view or a third person point-of-view of the user. For example, the virtual camera is set to be at a position corresponding to the point of view (first person point-of-view) of the user moving body in the virtual space, which corresponds to the user in the real space, and the point-of-view position and/or line-of-sight direction of the virtual camera is set to control the position (position coordinates) and/or the orientation (a rotational angle about a rotation axis) of the virtual camera. Alternatively the virtual camera is set to a position of the point of view (third person point-of-view) for following the user moving body, and the point-of-view position and/or line-of-sight direction of the virtual camera is set to control the position and/or the orientation of the virtual camera.

For example, the virtual camera control section 112 controls the virtual camera to follow a change in the point of view of a user based on tracking information on the point-of-view information of the user acquired by point-of-view tracking. For example, in the present embodiment, tracking information (point-of-view tracking information) on point-of-view information that is at least one of the point-of-view position and line-of-sight direction of the user is acquired. For example, the tracking information can be acquired by performing a tracking process with respect to the HMD 200. The virtual camera control section 112 changes the point-of-view position and/or line-of-sight direction of the virtual camera based on the acquired tracking information (information on at least one of the point-of-view position and line-of-sight direction of the user). For example, the virtual camera control section 112 sets the virtual camera so that the point-of-view position and/or line-of-sight direction (position, orientation) of the virtual camera in the virtual space changes in accordance with the change in the point-of-view position and/or line-of-sight direction of the user in the real space. As a result, the virtual camera can be controlled to follow the change in the point of view of the user, based on the tracking information on the point-of-view information of the user.

The game processing section 114 (a program module for a game process) performs various game processes for the user to play the game. In other words, the game processing section 114 (simulation processing section) performs various simulation processes to enable the user to experience MR (Mixed Reality), AR (Augmented Reality), VR (Virtual Reality) or the like. Examples of the game processes include a process of starting the game when a game start condition is satisfied, a process of making the started game progress, a process of ending the game when a game end condition is satisfied, and a process of calculating a game result.

The display processing section 120 performs a display process for a virtual space image (a game image, a simulation image). For example, a rendering process is performed based on results of various processes (a game process, a simulation process) performed by the processing section 100 to generate an image, and the image is displayed in the display section 190. Specifically a geometry process such as coordinate transformation (world coordinate transformation, camera coordinate transformation), a clipping process, a perspective transformation, or a light source process is performed, and rendering data (coordinates of the vertex position of the primitive surface, texture coordinates, color data, a normal vector, an a value, or the like) is generated based on a result of the process. An object (one or a plurality of primitive surfaces) after the perspective transformation (after the geometry process) is rendered in the rendering buffer 178 (a buffer such as a frame buffer, or a work buffer that can store image information in a unit of pixels), based on the rendering data (primitive surface data). Thus, an image as viewed from the virtual camera (a given point of view, first and second point of views for left-eye and right-eye) in the virtual space is generated. The rendering process performed by the display processing section 120 can be implemented by a vertex shader process, a pixel shader process, or the like.

The sound processing section 130 (a program module for a sound process) performs a sound process based on results of various processes performed by the processing section 100. Specifically, game sound such as a song (music, background music (BGM)), a sound effect, or a voice is generated to be output by the sound output section 192.

The simulation system according to the present embodiment includes the information acquisition section 102, the virtual space generation section 104, the object processing section 106, and the display processing section 120, as illustrated in FIG. 1.

The information acquisition section 102 (a program module for information acquisition process) acquires real space information that is obtainable by performing a recognition process of the real space around the user. The information acquisition section 102 also acquires user information including position information of the user. The real space recognition process can be achieved by, for example, spatial mapping. For example, spatial mapping can be achieved by performing a real space recognition process using various cameras provided as the image capturing section 164. For example, as shown in later-described FIG. 2, the real space recognition process is performed using an RGB camera 246, a depth camera 247, and environment recognition cameras 248 and 249 provided in the HMD 200. The real space information is 3D map information of the real space obtained by a real space recognition process (spatial mapping), which is information obtained by meshing the scanned real space. The real space information obtained by scanning the real space is stored in the real space information storage section 171. The real space information includes, for example, multiple items of spatial data. Each one of the multiple spatial data items corresponds to each area of a real space obtained by dividing the real space into a plurality of areas and scanning the divided areas. Then, an ID (surface ID) is assigned to each item of spatial data and stored in the real space information storage section 171. For example, a polygon mesh is generated based on the spatial data with an ID assigned, thereby enabling meshing of the scanned real space, and displaying the real space. It also enables interaction between the map of the real space and the objects in the virtual space.

The information acquisition section 102 also acquires user information including position information of the user in the real space. The user information may include direction information of the user in the real space. As the position information of the user, for example, point-of-view position information of the user may be used. The direction information of the user may be, for example, line-of-sight direction information of the user. The position information (point-of-view position information) and the direction information (line-of-sight direction information) of the user can be acquired by a head tracking process of the HMD 200.

The virtual space generation section 104 (a program module for a virtual space generation process) performs a process of generating a virtual space corresponding to the real space based on the real space information acquired by the information acquisition section 102. The virtual space generation section 104 also performs a process of setting a virtual space, which is a three-dimensional space (game space). For example, mapping information obtained by a real space recognition process (spatial mapping) is set as virtual space information. For example, the virtual space information is set based on multiple items of spatial data, which correspond to a plurality of areas obtained by dividing the real space. The virtual space information is stored in the object information storage section 172 as object information.

The virtual space generation section 104 (virtual space setting section) performs a process of setting a virtual space (object space) in which an object is disposed. For example, a process of setting disposition of various objects (objects each formed by a primitive surface such as a polygon, a free-form surface or a subdivision surface) in the virtual space is performed, the various objects representing various display objects such as a moving body (such as a user moving body or a character), a disposed object, a map (terrain), a building, audience seats, a course (road), woods, a wall, and a water surface. Specifically, a position and a rotational angle (that is the same as an orientation or a direction) of an object in a world coordinate system are determined, and the object is disposed at the position (X, Y, Z) at the rotational angle (rotational angles about X, Y, and Z axes). More specifically, the object information storage section 172 of the storage section 170 stores object information in association with an object number. The object information includes information about a position, a rotational angle, a movement speed, a moving direction, or the like of an object (part object) in the virtual space. Examples of the process performed by the virtual space generation section 104 include updating the object information on a frame by frame basis.

The object processing section 106 (a program module for object processing) performs various processes regarding the character object and the disposed object. More specifically, the object processing section 106 sets a reference point in the virtual space based on the user information and the real space information. For example, the object processing section 106 sets a reference point in the virtual space based on the position information of the user and the real space information. The reference point setting process is performed by a reference point setting section 108. The object processing section 106 also performs a process of disposing an object of a character in the virtual space based on the reference point. For example, the object processing section 106 performs a process of disposing (causing appearance of) a character at a disposition point (appearance point) which is set according to the reference point. The display processing section 120 (a program module for a display process) performs a process of displaying an image including a character image in the display section 190. For example, the display processing section 120 performs a process of displaying an image (virtual space image) including a character image in a display device of the HMD 200.

In the present embodiment, the object processing section 106 sets a hit volume based on the position of the user moving body in the virtual space corresponding to the user. For example, the position of the hit volume is determined and disposed based on the position of the user moving body. The hit volume may be set at the position of the body part of the user or the positions of the belongings specified by the position of the user moving body. When the user performs a given input, the object processing section 106 performs a process with respect to the character in accordance with the positional relationship between the hit volume and the character. Whether or not the user has performed a given input can be detected using, for example, the operation section 160 or the detection section 162. For example, when the user performs a given operation, the operation section 160 determines that the user has performed a given input. It is also possible to determine that the user has performed a given input when the detection section 162 detects a given motion of the user (a movement of a body part of the user such as a hand). The detection of a given motion of the user may also be performed by capturing an image of a given motion of the user by the image capturing section 164.

The object processing section 106 also determines the positional relationship between the hit volume and the character at the time when the user performs a given input. For example, a hit determination process (collision determination process) is performed to determine whether the position of the character is within the hit volume. Alternatively, a hit determination process may be performed by determining whether or not a hit volume that is set based on the position of the user moving body and a second hit volume that is set based on the position of the character cross each other. The hit determination process is performed by a hit processing section 109. Further, when the user performs a given input (at the time when a given input is performed), and if a given positional relationship between the hit volume and the character is confirmed, a process according to the positional relationship is performed with respect to the character. For example, when it is determined that the hit volume hits the character, a hit process is performed with respect to the character. Specifically, an eliminating process, a destroying process, a display mode changing process, or a notification process using sound or vibration, which will be described later, is performed.

The user moving body corresponds to the user in the real space, and may be a display object of an image of the user, or a virtual object with no image. For example, when an image of first person point-of-view is displayed as an image of the virtual space, the user moving body may not be displayed, or only a part (for example, a hand, a chest, or a face) of the user moving body may be displayed. When the user moving body is not displayed, for example, virtual cameras (virtual cameras for the left eye and the right eye) in the virtual space corresponding to the point-of-view of the user in the real space may be regarded as the user moving body (avatar).

The hit volume is, for example, a hit volume that is set with respect to body parts of the user or belongings of the user. The hit volume is set, for example, as a hit volume that includes a body part of the user or as a hit volume that includes belongings of the user. Further, by performing a hit determination process with respect to the hit volume and the character, it is possible to determine whether the body part or the belongings of the user has/have hit the character. The hit volume has, for example, a three-dimensional form, or may be a planar hit area.

Alternatively, the object processing section 106 sets a hit volume between the reference point and the user moving body in the virtual space corresponding to the user. For example, the object processing section 106 sets a hit volume in an area (intermediate area) between the position of the user moving body and the position of the reference point. For example, a hit volume is set on a line connecting the position of the user moving body and the position of the reference point. When the user performs a given input, the object processing section 106 performs a process with respect to the character in accordance with the positional relationship between the hit volume and the character. For example, the object processing section 106 performs a process with respect to the character, by determining the positional relationship between the hit volume and the character when the user performs a given input. Specifically, as described above, the presence or absence of a given input by the user is detected using, for example, the operation section 160 or the detection section 162. The object processing section 106 also determines the positional relationship between the hit volume and the character at the time when the user performs a given input. For example, a hit determination process is performed to determine whether the position of the character is within the hit volume. Alternatively, a hit determination process (collision determination process) may be performed by determining whether or not a hit volume that is set between the user moving body and the reference point and the second hit volume that is set based on the position of the character cross (collide with) each other. Further, when the user performs a given input, and if a given positional relationship between the hit volume and the character is confirmed, a process according to the positional relationship is performed with respect to the character. For example, a hit process is performed on the character. Specifically, an eliminating process, a destroying process, a display mode changing process with respect to the character, or a notification process using sound or vibration, which will be described later, is performed.

The object processing section 106 includes a moving body processing section 110. The moving body processing section 110 performs various processes for a moving body that moves in the virtual space. For example, the moving body processing section 110 performs a process of moving the moving body in the virtual space (object space, game space) or a process of causing the moving body to make an action. The moving body is a user moving body corresponding to the user, a character or the like. For example, the moving body processing section 110 performs a control process based on the operation information input by the user using the operation section 160, the acquired tracking information, a program (movement/operation algorithm), and various types of data (motion data), and the like. The control process includes moving the moving body (model object) in the virtual space and causing the moving body to make an action (motion, animation). Specifically, a simulation process is performed to sequentially obtain movement information (position, rotational angle, speed, or acceleration) and action information (a position or a rotational angle of a part object) of the moving body on a frame by frame basis (for example, 1/60 seconds). The frame is a unit of time for performing a movement/action process (simulation process) of the moving body and an image generation process.

Further, when the user moving body and the reference point have a first distance relationship, the object processing section 106 sets a hit volume based on the position of the user moving body, and performs a process with respect to the character in accordance with the positional relationship between the hit volume and the character when the user performs a given input. On the other hand, when the user moving body and the reference point have a second distance relationship, the object processing section 106 sets a hit volume between the user moving body and the reference point, and performs a process with respect to the character in accordance with the positional relationship between the hit volume and the character when the user performs a given input. In the case of the first distance relationship where the distance between the user moving body and the reference point is shorter than that in the second distance relationship, the hit volume is set based on the position of the user moving body, and the hit determination process and the like are performed accordingly. In contrast, in the case of the second distance relationship where the distance between the user moving body and the reference point is longer than that in the first distance relationship, the hit volume is set between the user moving body and the reference point, and the hit determination process and the like are performed accordingly.

Further, the object processing section 106 determines whether or not the user performs a given input based on information from the detection section 162 that detects the movement of the user. For example, movement, vibration, or acceleration of body parts of the user is detected based on a motion sensor (acceleration sensor or the like) of the detection section 162, so as to determine whether or not the user has performed a given input. For example, it is determined whether or not the user has performed a hitting action. Specifically, the time when the acceleration of a body part of the user rapidly changes is determined as the time when the user performs a given input. Further, a process with respect to the character is performed in accordance with the positional relationship between the hit volume and the character at the time when the user performs a given input.

The object processing section 106 also performs, as a process with respect to a character, a character eliminating process, a character destroying process, a character display mode changing process, or a notification process regarding the character. The character eliminating process is a process of hiding the character so that the character is invisible in the virtual space. The character destroying process is a process of displaying an image of a destroyed character or a process of generating a destruction effect. The character display mode changing process is a process of changing the color, the luminance (brightness), semi-transparency, texture, or the like of the character. The character notification process is a process of notifying the user of the occurrence of an aggressive hit event or the like on the character using sound, vibration, or the like. When the attack on the character is unsuccessful, an effecting process to indicate that the attack was unsuccessful may be performed.

Further, the object processing section 106 determines the disposition timing of the character in accordance with the distance between the user moving body and the reference point. For example, the character is disposed at a timing at which the distance between the user moving body and the reference point becomes shorter than a given distance. For example, at this timing, the character appears and is displayed. It is also possible to cause the character to disappear by removing the character from the virtual space when the distance between the user moving body and the reference point becomes longer than a given distance.

The object processing section 106 also sets the reference point in accordance with information of the situation of the user, information of the situation of the user moving body, information of the situation or the type of the character, or information of the game situation. For example, based on these types of information, determination of the setting position of the reference point or the number of reference points, or determination of a reference point appearance timing is performed. For example, the setting position of the reference point or the number of reference points, or the reference point appearance timing is changed. The information of the situation of the user is, for example, information of an age group, a physique, or a gender of the user. Alternatively, the information of the situation of the user is a situation of gameplay of the user. This information includes, for example, the user's game level (beginner, intermediate, or advanced), the number and the frequency of the games played by the user, and the game scores of the user. The information of the user moving body is information such as a status (level, experience point) or ability (offensive power, defensive power, and the like) of the user moving body, and is, for example, information represented by game parameters of the user moving body. The information of the character situation is such information as the status and the ability of the character, and is, for example, information represented by game parameters of the character. The information of character type is information indicating the type to which the character belongs. The information of game situation is, for example, the progress of the game, the stage in which the game is played, or the situation of the map.

The information acquisition section 102 acquires environment information in the real space. The environment information is information regarding the environment, such as the brightness and the size of the real space. For example, the environment information is brightness information or size information of a play field in which the user is positioned. The object processing section 106 sets a reference point according to the environment information. For example, based on the environment information, the object processing section 106 determines the setting position of the reference point or the number of reference points, or determines a reference point appearance timing. For example, the object processing section 106 changes the setting position of the reference point or the number of reference points, or changes the reference point appearance timing.

The object processing section 106 changes the hit volume according to the position of the reference point. For example, the object processing section 106 changes the size, the shape, the disposition location or the like of the hit volume according to the position of the reference point. For example, the object processing section 106 changes the hit volume by changing the size, the shape, the disposition location, or the like of the hit volume in accordance with, for example, the setting position or the setting timing of the reference point, or the relationship between the reference point and the user moving body.

The object processing section 106 also changes the hit volume in accordance with information of the situation of the user, information of the situation of the user moving body, information of the situation or the type of the character, or information of the game situation. For example, the object processing section 106 changes the size, the shape, the disposition location or the like of the hit volume by reflecting the user situation, the user moving body situation, the situation or the type of the character, or the game situation.

The information acquisition section 102 acquires position information of the user in the real space based on the point-of-view tracking information. The point-of-view tracking information can be acquired, for example, by performing a tracking process for the HMD 200. For example, the information acquisition section 102 acquires position information on the HMD 200 as the position information of the user who wears the HMD 200. For example, the tracking information may include at least one of change information about the change in the point-of-view position from the initial point-of-view position of the user (a value of change in the coordinates of the point-of-view position) and change information about the change in the line-of-sight direction from the initial line-of-sight direction of the user (a value of change in the rotational angle about the rotation axis of the line-of-sight direction). Based on such change information about the point-of-view information included in the tracking information, it is possible to identify the point-of-view position corresponding to the position of the user and the line-of-sight direction corresponding to the direction of the user. Instead of the HMD 200 tracking process, the position information of the user may be acquired by a process of directly tracking the user or a body part of the user such as the head of the user. The information acquisition section 102 may also acquire direction information or posture information of the user. For example, based on the tracking information obtained by the point-of-view tracking process, the information acquisition section 102 acquires direction information indicating the direction in which the user is facing in the real space. The information acquisition section 102 also acquires posture information, which is motion information of the user. The posture information is information for specifying a movement of a body part of the user such as a hand, a head, or a leg of the user. For example, the information acquisition section 102 acquires the posture information of the user by a process called Kinect (registered trademark). The position information acquired by the information acquisition section 102 may be information of a relative position.

Further, the display processing section 120 (image generation section) generates an image to be displayed in the display section 190 as a virtual space image. The virtual space image is, for example, an AR or MR image. The virtual space image may be a VR image. The AR image is an image displayed so that it is superimposed on a display object constituting a scenery or the like in the real space. The MR image is an image generated by the MR method in which a real space and a virtual space are mixed to construct a new space that enables real-time interaction of a real world and a virtual world. MR is a concept including all augmented reality and augmented virtual reality. The VR image is, for example, an image generated so that the VR space extends to the entire periphery of the field of view of the user wearing the HMD 200 described later.

The display processing section 120 generates, as a display image of the HMD 200, an image that can be seen from a virtual camera (given point-of-view) in the virtual space. For example, the display processing section 120 performs a process of rendering an image viewed from a virtual camera set at the point-of-view of a character (user character or character of another user) (first person point-of-view). Alternatively, the display processing section 120 performs a process of rendering an image viewed from a virtual camera set at a point-of-view following a character (third person point-of-view). The generated image is preferably a stereoscopic image such as an image for the left eye or an image for the right eye.

Further, according to the present embodiment, a virtual reality simulation process is performed as a game process for the game played by the user. The virtual reality simulation process is a simulation process of simulating a real space event in the virtual space, and is for enabling the user to virtually experience the event. For example, the virtual reality simulation process includes a process of moving the user moving body (such as a virtual user corresponding to the user in the real space or its ridden moving body) in the virtual space, and a process that enables the user to experience a change in an environment or surroundings along with the movement.

The process of the simulation system of the present embodiment shown in FIG. 1 may be implemented by a built-in processor or a built-in memory of the HMD 200. For example, the built-in processor in the HMD 200 performs each process of the present embodiment, and displays an image (virtual space image) generated by the process of the present embodiment in the display section 190 of the HMD 200. Alternatively, the process of the simulation system of the present embodiment may be implemented by a consumer game apparatus or an arcade game apparatus, or by a distributed process by a consumer game apparatus, an arcade game apparatus, and a server system. Alternatively, the simulation system of the present embodiment may be implemented by a processing apparatus such as a personal computer provided in a facility, a processing apparatus worn by a user, or by a distributed process by these processing apparatuses. For example, a user wears a jacket, and a processing apparatus such as a backpack PC is attached to the back side of the jacket. Then, a processing apparatus such as a backpack PC worn by the user executes each process of the present embodiment, and generates an image (virtual space image) to be displayed in the display section 190. Alternatively, a distributed process by a processing apparatus worn by a user and a management processing apparatus provided in a facility executes each process of the present embodiment, and generates an image to be displayed in the display section 190. Alternatively, the process of the simulation system of the present embodiment may be implemented by a portable communication terminal that can be communicably connected to a network, or by a portable communication terminal and a server system. For example, the process may be implemented by a distributed process by a portable communication terminal and a server system.

2. HMD

An HMD 200 used in the present embodiment and a tracking process using the HMD 200 are described below.

FIG. 2 illustrates an example of an HMD 200 used in the present embodiment. The HMD 200 shown in FIG. 2 is a see-through (transparent) eye-piece type HMD. Specifically, the HMD 200 is an optical see-through type HMD. This see-through type HMD 200 enables, for example, display of MR/AR virtual space images.

The HMD 200 shown in FIG. 2 has a temple section 240 and a goggle section 242. The temple section 240 has a built-in speaker. The goggle section 242 includes a display device 243 and a holographic optical element 244. The display device 243 has a display unit including a micro display, a mirror, a prism, and the like. The display device 243 has a display unit for left eye and a display unit for right eye, thereby obtaining stereoscopic vision. Further, a pair of micro displays provided in each of the left-eye and right-eye display units makes the position of the virtual image variable.

The light displayed from the display device 243 is guided to the front of the eyes of the user US while being refracted inside the light guide plate of the holographic optical element 244. The holographic optical element 244 then refracts the display light in the eyeball directions, thereby transmitting the display light to the eyeballs. As a result, a virtual image (hologram reproduction image) appears as if it existed in front of the eyes. The light guide plate of the holographic optical element 244 is also referred to as a combiner. The combiner, which is a half mirror, produces an image in which a virtual image is superimposed on a real image in the outside world, thereby realizing MR and AR.

The goggle section 242 includes an RGB camera 246, a depth camera 247, and environment recognition cameras 248 and 249. By using the RGB camera 246, it is possible to capture an image in the front direction of the user US. By using the depth camera 247, depth information (information of the depth) in the front direction can be acquired. For example, the goggle section 242 includes an emitter (not illustrated) for the depth camera. Then, an infrared pattern is projected onto an object in the real space by an IR projector serving as an emitter, the projected infrared pattern is read by an infrared camera serving as the depth camera 247, and depth information of the object in the real space is acquired from the distortion of the pattern. Further, by using the environment recognition cameras 248 and 249, it is possible to recognize the environment around the user US. The goggle section 242 has a built-in inertial measurement unit (IMU) constituted of an acceleration sensor and a gyro sensor. The position and the direction of the head of the user US are detected based on an image captured by the cameras provided in the goggle section 242, measurement information from the inertial measurement unit, and the like, thereby enabling head tracking. It is also possible to acquire position information (point-of-view position information) and direction information (line-of-sight direction information) of the user US. Further, use of the RGB camera 246, the depth camera 247, and the environment recognition cameras 248 and 249 realizes a process of recognizing the real space, which is called spatial mapping. Use of these cameras for scanning of the surroundings of the user in the real space realizes a process of recognizing the real space around the user, and enables acquisition of information of the real space. Further, use of these cameras also enables acquisition of position information (relative position information), direction information (relative direction information), or posture information (motion information) of other users around the user US. For example, acquisition of the posture information by Kinect (registered trademark) or a similar process allows detection of the type of action performed by the other user(s). It is also possible to acquire a motion of a body part of the user or the like as the posture information (motion information) of the user.

FIG. 3 illustrates another example of the HMD 200. The HMD 200 shown in FIG. 3 is an HMD that covers the entire field of view of the user wearing the HMD. The display section of the HMD shown in FIG. 3 is implemented by, for example, an organic EL display (OEL) or a liquid crystal display (LCD). For example, the display section of the HMD 200 is provided with a first display or a first display area that is set in front of the left eye of the user, and a second display or a second display area that is set in front of the right eye of the user, whereby stereoscopic display can be provided. When the stereoscopic display is provided, for example, a left-eye image and a right-eye image of different parallaxes are generated to be displayed in the first display and the second display, respectively. Alternatively, the left-eye image and the right-eye image are respectively displayed in the first and the second display areas of a single display. The HMD 200 is provided with two eyepieces (fish-eye lenses) for the left-eye and the right-eye so that a VR space can be provided entirely over the field of view of the user. A correction process is performed for the left-eye image and the right-eye image to correct distortion produced in an optical system such as the eyepieces.

The HMD 200 shown in FIG. 3 includes an RGB camera 216, a depth camera 217, and environment recognition cameras 218 and 219. Use of these cameras provides a video see-through type HMD 200, thereby enabling MR and AR. Further, use of these cameras also enables a real space recognition process, acquisition of position information, direction information, posture information (motion information) of other users, and acquisition of posture information of the user, as in the HMD 200 shown in FIG. 2.

In the HMD 200 shown in FIG. 3, the tracking process that acquires the position information and the direction information of the user may be performed by an inertial measurement unit (IMU) which is a built-in unit of the HMD 200 and includes an acceleration sensor and a gyro sensor. It is also possible to provide a plurality of light receiving elements in the HMD 200, and provide a measurement device (base station) having a light emitting element around the user. Then, the position information (point-of-view position information) and the direction information (line-of-sight information) of the user may be acquired by a tracking process of the HMD 200 that involves receiving light such as a laser from a light emitting element (LED) of the measurement device (a plurality of measurement devices) using a light receiving element of the HMD 200. It is also possible to provide a plurality of light emitting elements in the HMD 200 and provide a measurement device having cameras (first and second cameras) around the user. Then, the position or the like of the head of the user US in the depth direction is detected by capturing the light from the light emitting element of the HMD 200 with the cameras of the measurement device. Further, it is also possible to detect the rotational angle (line-of-sight) of the head of the user US based on detection information of the inertial measurement unit (motion sensor) provided in the HMD 200, thus performing the tracking process of the HMD 200.

Note that various modifications can be made to the tracking process that acquires the position information, the direction information, and the like of the user. For example, the tracking process may be performed by the HMD 200 alone by using the inertial measurement unit provided in the HMD 200. The tracking process may also be performed by providing the external measurement device described above. Alternatively, various point-of-view tracking processes such as known eye tracking, face tracking, or head tracking may be performed.

Further, a device known as smartphone VR or VR goggle may be used as the HMD 200. In this type of HMD 200, the smartphone is stored in the goggle section of the HMD 200 so that the display section of the smartphone faces the eyes of the user. A left-eye eyepiece and a right-eye eyepiece are provided inside the goggle section (VR goggle). The user views the left-eye image and the right-eye image displayed in the display section of the smartphone through the left-eye eyepiece and the right-eye eyepiece, respectively, thereby viewing the VR stereoscopic image. Tracking process for specifying the point-of-view position and the line-of-sight direction of the user can be performed based on an inertial measurement unit (acceleration sensor, gyro sensor) or the like incorporated in the smartphone. Further, the real space recognition process may be performed using a camera provided in the goggle section or the smartphone.

3. Method According to the Present Embodiment

Next, a method according to the present embodiment will be described in detail. The following mainly describes an exemplary case where the method of the present embodiment is applied to an attraction game in which a user wears an HMD and kills a character such as a mosquito. However, the method of the present embodiment can be applied to various games (a virtual experience game, a fighting game, a racing game, an RPG, a sport game, a thriller experience game, a simulation game for rides such as trains and aircrafts, a puzzle game, a communication game, a music game or the like) and can also be applied to something other than games. In the following description, the user moving body in the virtual space corresponding to the user in the real space is referred to as a user character. The user character may be a displayed object or a virtual character that is not displayed as an object.

3.1 Description on Game

Figure 4A:
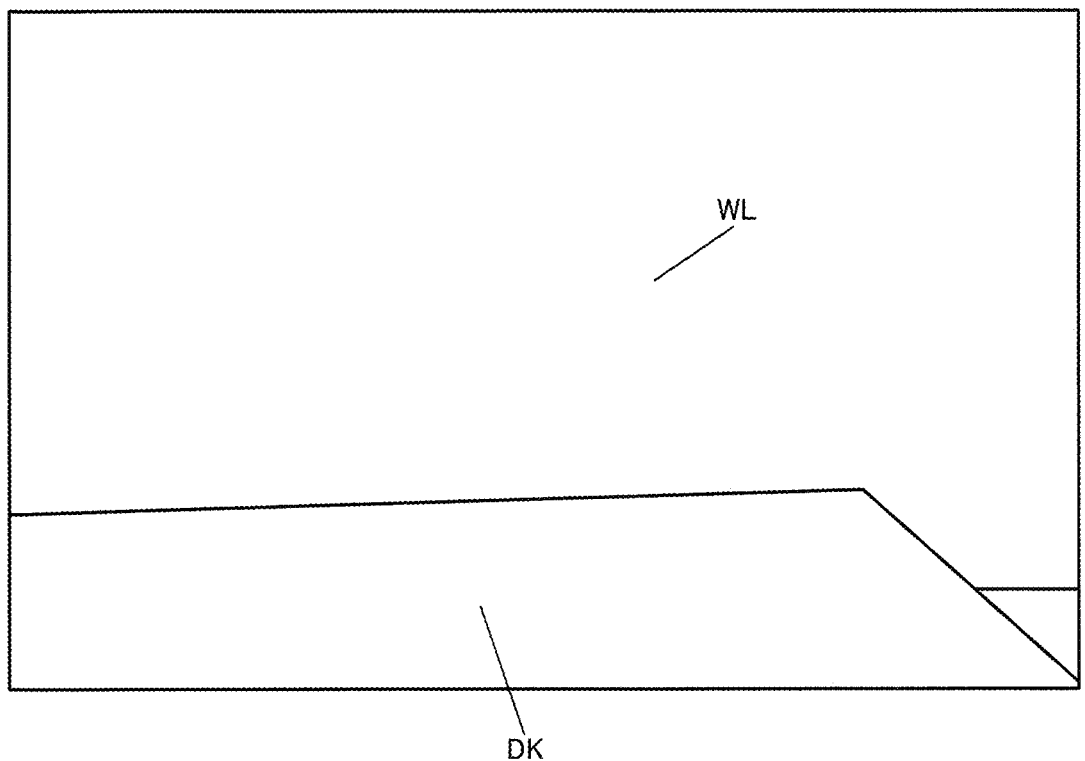
FIG. 4A and FIG. 4B are explanatory diagrams illustrating a real space information acquisition process by a real space recognition process.
Figure 4B:
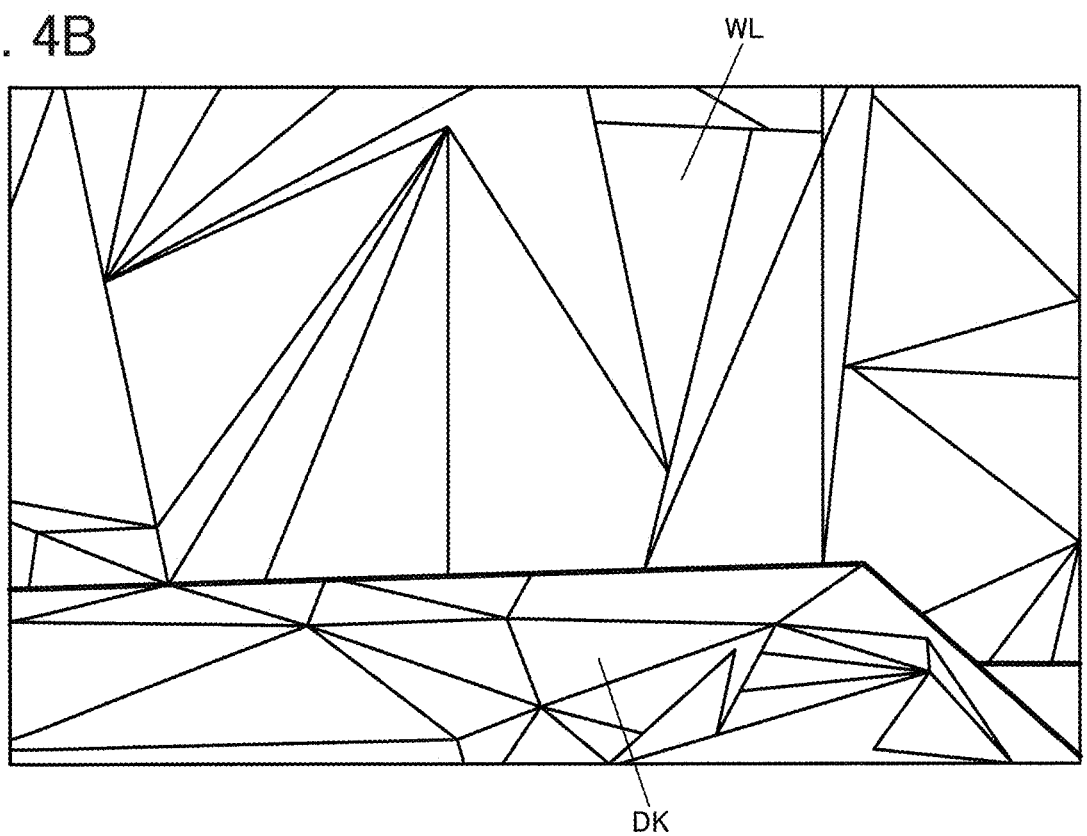

First, an attraction game implemented by the present embodiment is described below. The present embodiment acquires real space information by performing a recognition process of the real space around the user, and generates a virtual space corresponding to the real space based on the acquired real space information. For example, in FIG. 4A, objects such as a desk DK and a wall WL are present in the real space. Real space information is acquired by a recognition process in which the real space is scanned using the cameras provided in the HMD 200 of FIGS. 2 and 3. Specifically, as shown in FIG. 4B, real space information is acquired as wire frame data in which the real space is meshed. This real space recognition process is executed, for example, in real time, and the real space around the user is sequentially scanned to acquire real space information. For example, spatial data associated with an ID is sequentially acquired, and is accumulated and stored as the real space information in the real space information storage section 171 shown in FIG. 1. The real space information also has depth information (depth value). Use of the depth information enables, for example, a process of eliminating a hidden surface between an object in the virtual space and an object in the real space. Further, generation of a virtual space based on the real space information realizes interaction between a virtual object (character, disposed object) and an object (desk DK, wall WL) in the real space, and enables, for example, a hit process (collision process) between a virtual object and an object in the real space. A novel type of MR and AR (hereinafter, simply referred to as MR) can thus be achieved.

Figure 5:
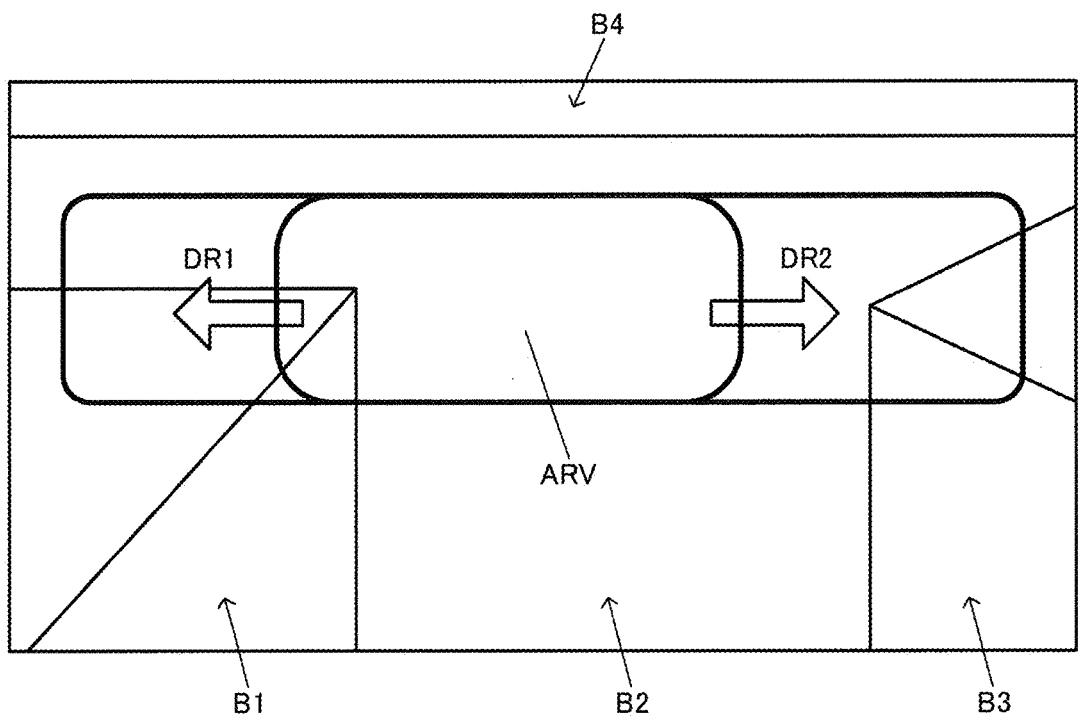
FIG. 5 is an explanatory diagram illustrating a display area of an HMD.

FIG. 5 shows an image seen by a user through the optical see-through type HMD 200 of FIG. 2. In areas B1, B2, B3, and B4 in FIG. 5, scenery such as a background object in the real space appears to the user's eyes. Further, a virtual space image generated by the display device 243 of FIG. 2 is displayed in a display area ARV. When the user shakes his/her head to the left and right, the location of the display area ARV moves to the left and right as indicated by DR1 and DR2. An image of an object in the virtual space, such as a character or a disposed object, is displayed on the display device 243. As a result, it is possible to achieve MR in which the real space sceneries in B1, B2, and B3 and the virtual space images in the display area ARV are mixed. Although FIG. 5 shows an example in which the display area ARV has a narrow display area and a small viewing angle, the display area and the viewing angle of the ARV can be enlarged by improving the devices in the HMD 200.

Figure 6:
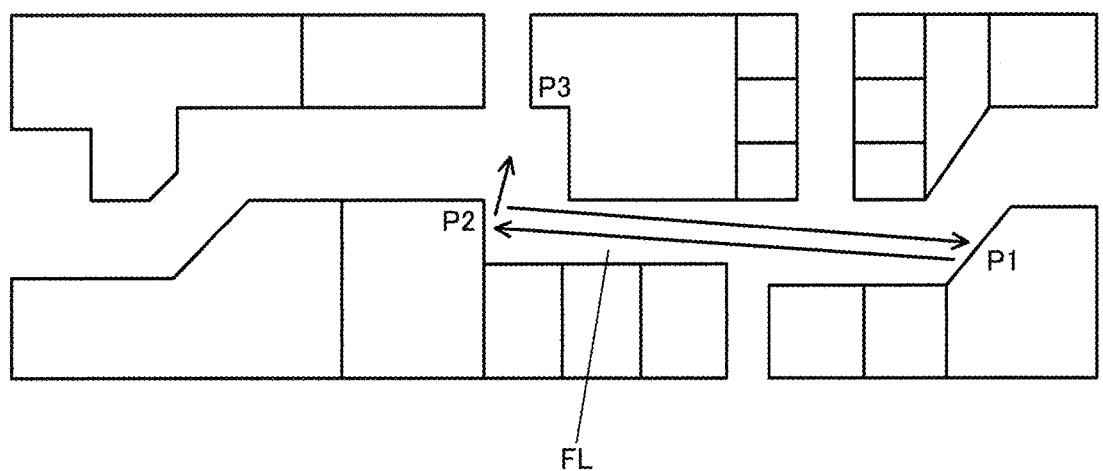
FIG. 6 is an explanatory diagram illustrating a play field in a real space.

FIG. 6 shows an example of a play field FL used in the attraction game of the present embodiment. In the attraction game of the present embodiment, for example, a shopping arcade with some shops or the like is provided in the play field FL in an indoor theme park. For example, the user wears the HMD 200 shown in FIG. 2 and explores the play field FL with a friend or the like. Specifically, the user starts from the place P1, moves to the place P2, then kills a mosquito (character) that appears in the place P3, and finally returns to the place P1. Thereafter, the user plays a ride-type attraction game, such as the one described with reference to FIG. 14.

In the present embodiment, a virtual space corresponding to the play field FL in the real space is generated by performing a real space recognition process using the cameras provided in the HMD 200 of FIG. 2. In this case, as the user wearing the HMD 200 moves in the play field FL, the real space around the moving user is sequentially scanned, stored and updated as real space information.

Figure 7A:
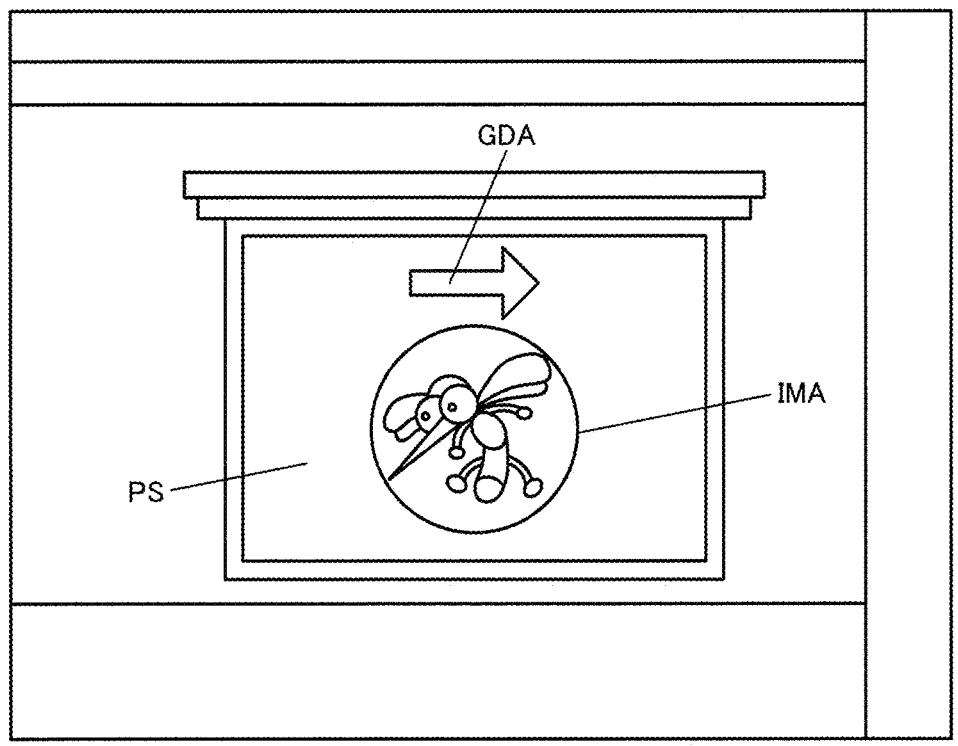
FIG. 7A and FIG. 7B are explanatory diagrams illustrating an attraction game according to the present embodiment.
Figure 7B:
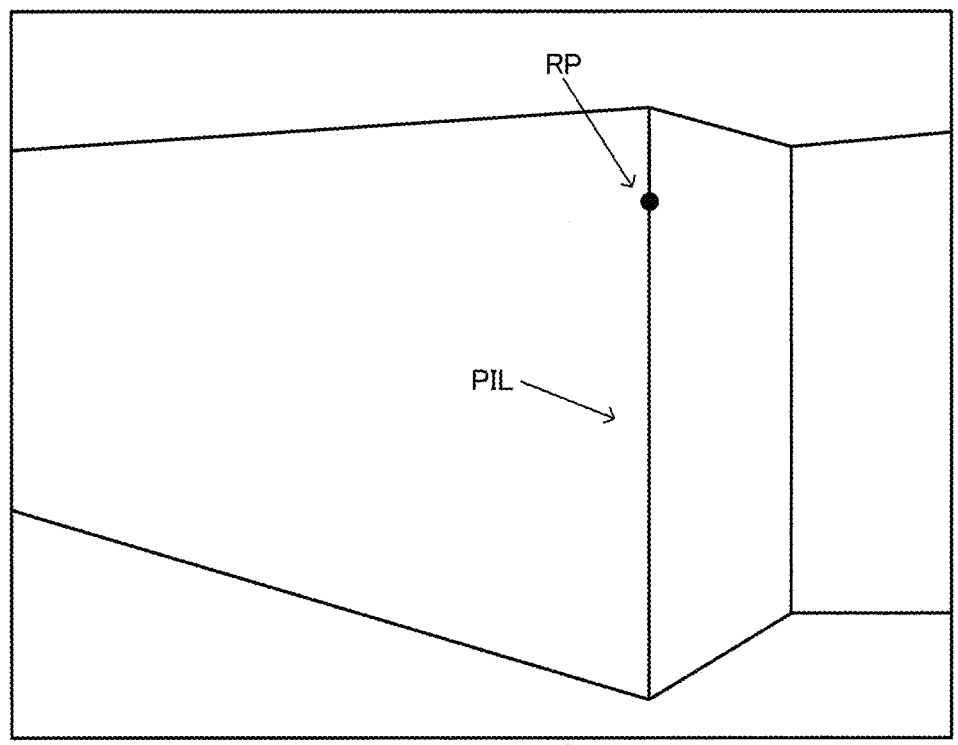

When the user moves to the place P2 in FIG. 6, a poster PS as a marker is attached to a wall in front of the user as shown in FIG. 7A. A process of recognizing the poster PS (marker) is performed using the cameras of the HMD 200, and thereby an image IMA with a picture of a mosquito and a guide GDA are displayed. Specifically, the image IMA and the guide GDA are displayed in the display area ARV of FIG. 5. The guide GDA points to the place P3 in FIG. 6. When the user looks at the place P3, a scenery shown in FIG. 7B appears to the user. Then, as shown in FIG. 7B, a reference point RP is set at a position corresponding to a pillar PIL. For example, in the present embodiment, the real space information is acquired by the real space recognition process, and the reference point RP is set based on the user information such as the position information of the user and the real space information. More specifically, a process of recognizing the pillar PIL in the real space is performed by the cameras in the HMD 200, and a virtual object corresponding to the pillar PIL in the real space is generated in the virtual space. For example, a mesh polygon virtual pillar object is generated just like a desk shown in FIG. 4B. Then, the reference point RP is set at a position corresponding to the pillar object. For example, if it is determined that the position of the user is close to the pillar object based on the position information of the user, the reference point RP is set on the pillar object. In this way, the reference point RP can be set at a position corresponding to the pillar PIL in the real space. Note that the real space recognition process by the cameras in HMD 200 may not acquire accurate coordinates. Therefore, the absolute coordinate of the position of the marker, which is for example the poster PS in FIG. 7A, may be used to ensure accurate coordinate setting.

Figure 8A:
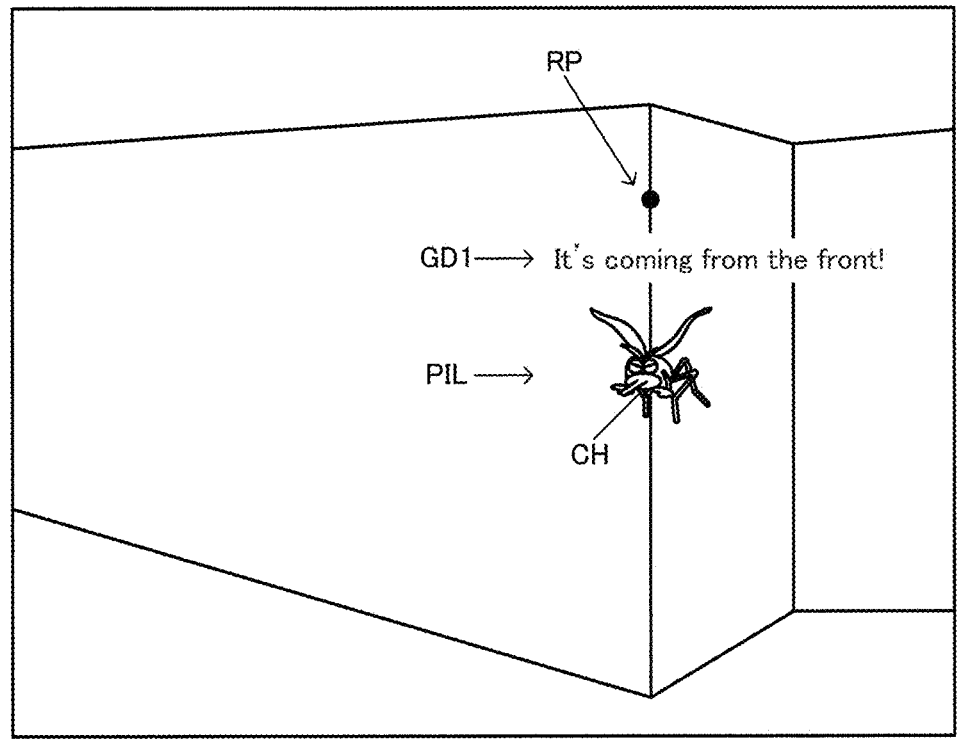
FIG. 8A and FIG. 8B are explanatory diagrams illustrating an attraction game according to the present embodiment.

In the present embodiment, as shown in FIG. 8A, the object of a mosquito character CH is made to appear based on the set reference point RP. For example, the mosquito character CH is disposed and made to appear at a disposition point (disposition place) specified by the reference point RP. Accordingly, the image of the mosquito character CH is displayed in the display area ARV described above with reference to FIG. 5, thereby achieving MR in which the mosquito appears at the position of the pillar PIL in the real space. Specifically, it is possible to display an image in which the scenery (pillar) in the real space and the image (mosquito) in the virtual space are mixed. In the present embodiment, the reference point RP is set on the virtual pillar object generated by the real space recognition process. Therefore, it is possible to make the mosquito character CH appear from the point corresponding to the pillar PIL in the real space without using, for example, an AR marker or the like. FIG. 8A illustrates a guide GD1 with the text message "It's coming from the front". The guide GD1 is a disposed object in the virtual space, and the disposition point of the disposed object of the guide GD1 is also set based on the reference point RP.

Figure 8B:
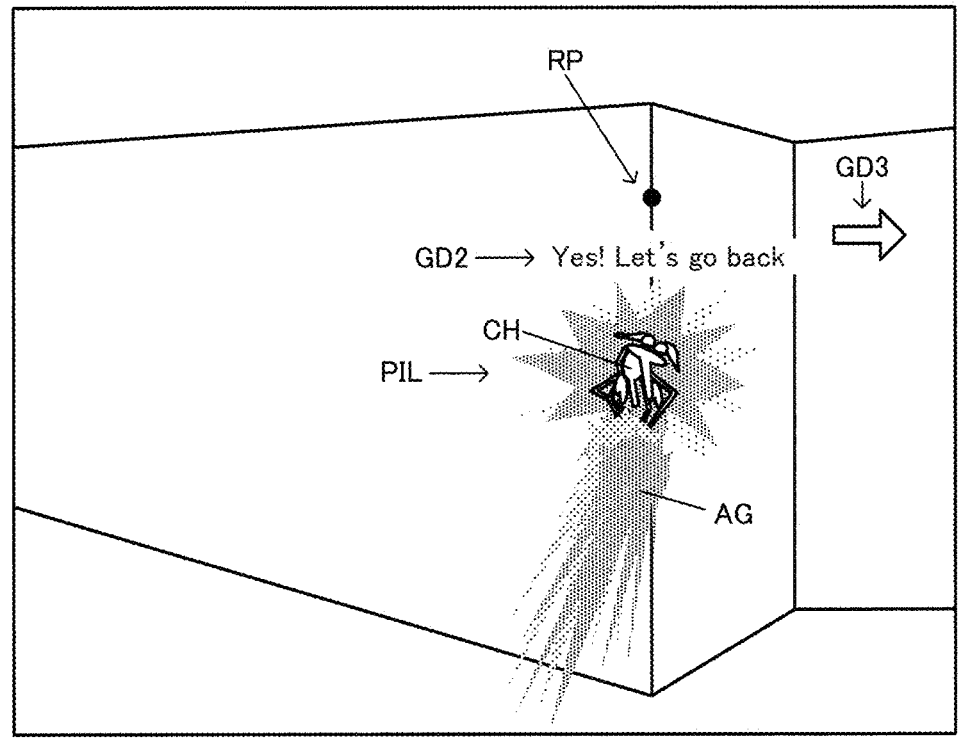

In FIG. 8B, an attack effect AG (air gun) is displayed when the user performs a hand clapping action with both hands in a manner described later with reference to FIGS. 9A to 10. Then, the attack effect hits the mosquito character CH, thereby killing the mosquito. When the mosquito is successfully killed, a guide GD2 with the text message "Yes! Let's go back" is displayed. A guide GD3 pointing the returning direction of the user is also displayed. The disposition locations of the guides GD2 and GD3 as the disposed objects are also set based on the reference point RP.

Figure 9A:
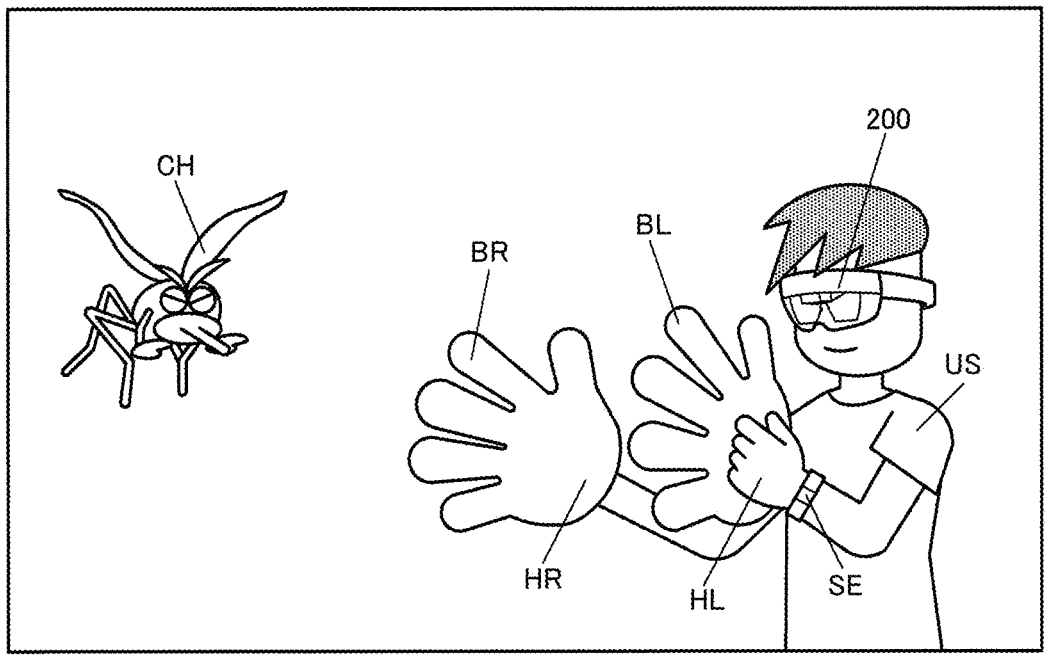
FIG. 9A and FIG. 9B are explanatory diagrams illustrating a hit process according to the present embodiment.
Figure 9B:
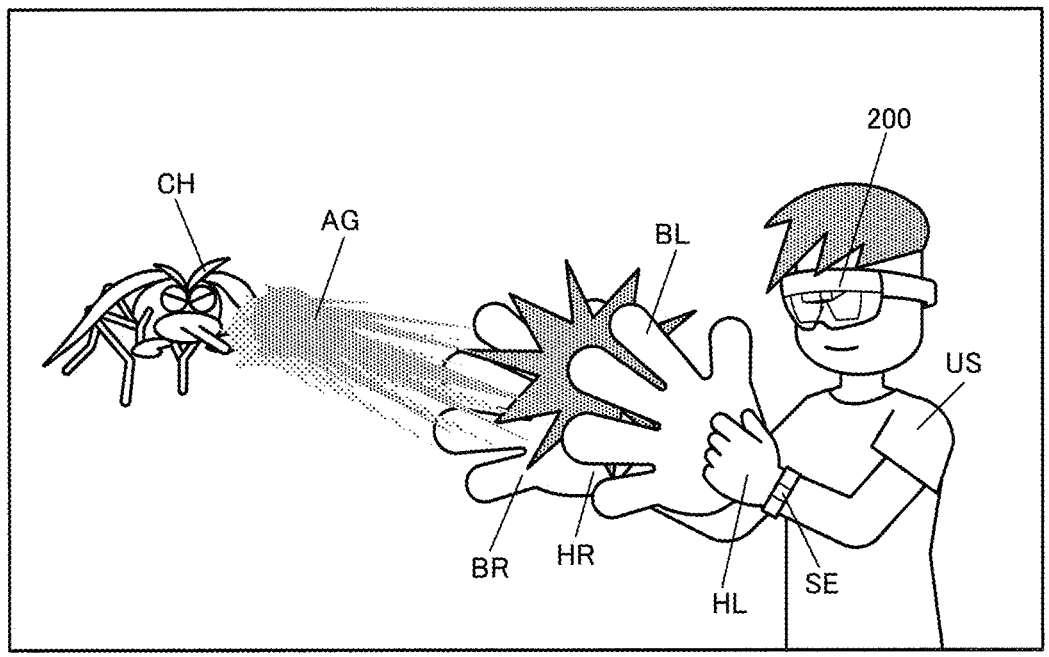
Figure 10:
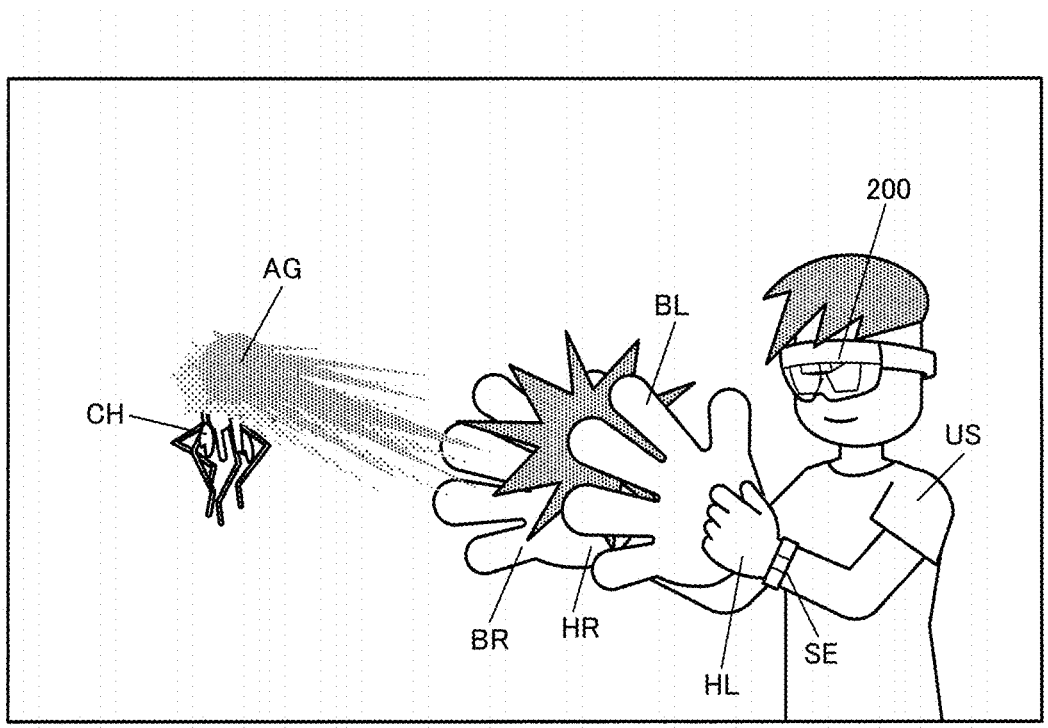
FIG. 10 is an explanatory diagram illustrating a hit process according to the present embodiment.

In FIGS. 9A to 10, the user (US) wears the HMD 200 of FIG. 2 on the head. The user holds belongings BL and BR with the hands HL and HR. The belongings BL and BR are implemented by, for example, hand-shaped large paper fans. Further, an arm sensor SE is attached to the hand HL. The arm sensor SE is an armband-type motion sensor (gesture sensor), and therein includes an acceleration sensor, a tri-axial gyro sensor, a myoelectric potential sensor, and the like. The arm sensor SE attached to the hand HL can detect movement of the arm, opening and closing of the palm, and the like. As shown in FIGS. 9A and 9B, when the user performs a hand clapping action with the hands HL and HR, movement of this action is detected by the acceleration sensor or the like of the arm sensor SE. The arm sensor SE corresponds to the detection section 162 of FIG. 1, and a hand clapping action with the hands HL and HR corresponds to a given input performed by the user in the present embodiment. With this action, the attack effect AG is displayed, and, as shown in FIG. 10, the mosquito character CH is killed, and disappears or is destroyed.

In the case shown in FIGS. 9A to 10, a hit volume HV is set between a user character USC (user moving body in a broad sense) corresponding to the user (US) and the character CH, and a hit determination process (collision determination process) with respect to the character CH is performed using this hit volume HV, as described later with reference to FIGS. 19A and 19B. More specifically if the distance between the user character USC and the character CH is long, the hit determination process is performed by the method shown in FIGS. 19A and 19B.

Figure 11A:
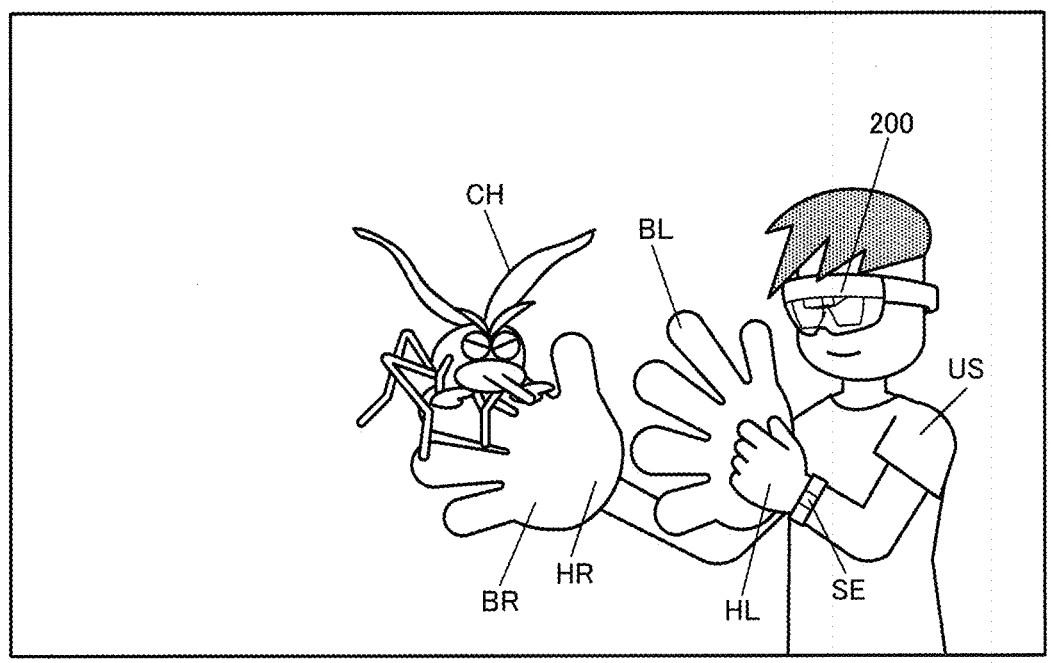
FIG. 11A and FIG. 11B are explanatory diagrams illustrating a hit process according to the present embodiment.
Figure 11B:
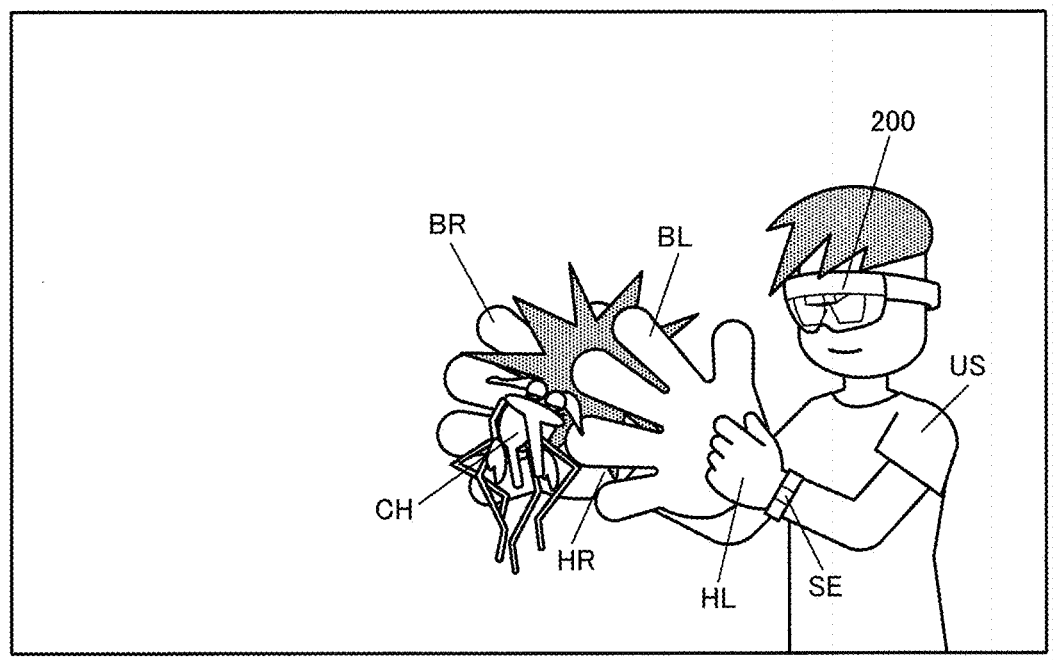

On the other hand, in FIGS. 11A and 11B, the hit volume HV is set based on the position of the user character USC, and the hit determination process with respect to the character CH is performed using this hit volume HV, as described later with reference to FIGS. 17A and 17B. More specifically, if the distance between the user character USC and the character CH is short, the hit determination process is performed by the method shown in FIGS. 17A and 17B. In this case, for example, it may be arranged such that the belongings objects corresponding to the belongings BL and BR may appear in the virtual space, and the sizes of the belongings objects are increased each time the user claps the hands HL and HR. This arrangement can allow the belonging objects to hit and kill a mosquito character CH located at a relatively distant place.

After the mosquito appeared in the place P3 in FIG. 6 is killed as described with reference to FIGS. 8A to 11B, the user returns to the place P1, i.e., the initial starting point. In this situation, the present embodiment disposes, as shown in FIGS. 12A to 13B, disposed objects OB1 to OB4 serving as guides for leading and moving the user from the place P3 to the place P1 in the virtual space. More specifically, the reference point RP is set with respect to the place P1, and the disposed objects OB1 to OB4 are disposed based on the reference point RP. In this case, the present embodiment performs the real space recognition process as described with reference to FIGS. 4A and 4B, and acquires the real space information. Then, the reference point RP is set based on the user information such as the position information of the user and the acquired real space information. More specifically, the real space recognition process is performed using the cameras in the HMD 200, and a virtual object corresponding to an object (for example, an entrance, a wall, or a door) disposed in the place P1 is generated in the virtual space. Then, the reference point RP is set at a position corresponding to the virtual object. In this way, the reference point RP can be appropriately set with respect to the place P1, and the disposed objects OB1 to OB4 serving as guides for leading the user can be appropriately disposed between the place P1 where the reference point RP is set and the user.

Further, in the present embodiment, the display mode of the disposed objects OB1 to OB4 is changed in accordance with the positional relationship between the disposed objects OB1 to OB4 and the user character (user moving body) in the virtual space corresponding to the user.

Figure 12A:
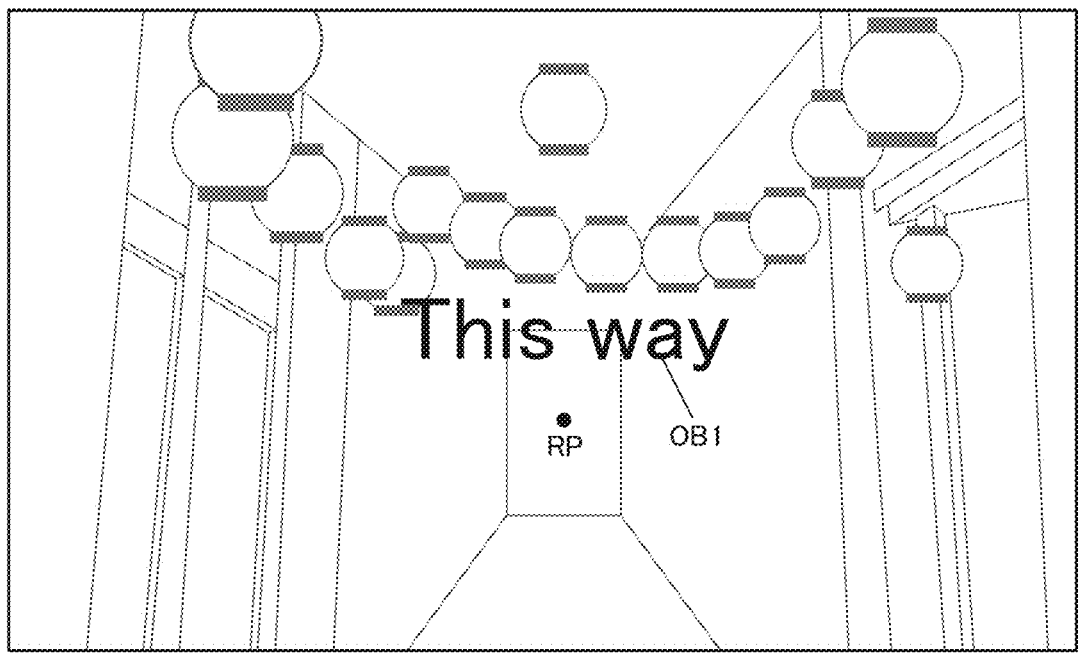
FIG. 12A and FIG. 12B are explanatory diagrams illustrating an attraction game according to the present embodiment.

For example, in FIG. 12A, the disposed object OB1 disposed at a position far away from the reference point RP is set to the display state and is thus displayed. More specifically, the image of the disposed object OB1 is displayed in the display area ARV of FIG. 5. The disposed object OB1 is, for example, a text message "This way".

Figure 12B:
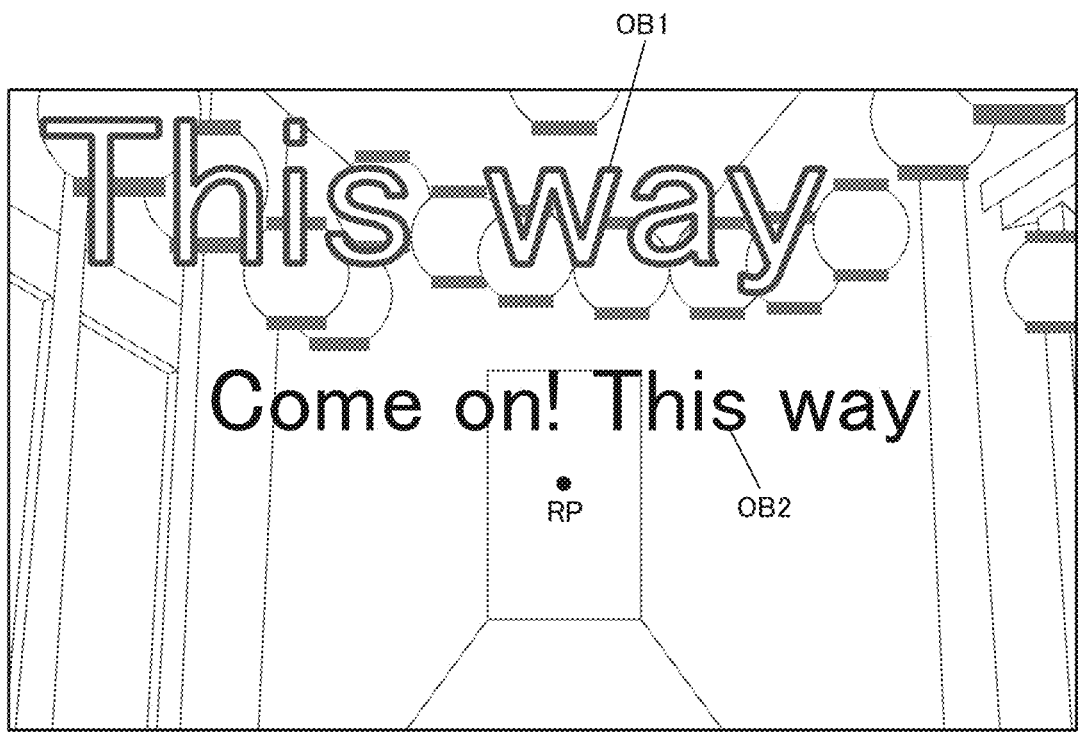

Thereafter, when the user moves toward and approaches the reference point RP of the place P1, the next disposed object OB2 is set to the display state and is displayed as shown in FIG. 12B. Compared with the disposed object OB1, the disposed object OB2 is disposed closer to the reference point RP. The disposed object OB2 is, for example, a text message "Come on! This way". In this situation, the display mode of the disposed object OB1 changes from opaque to semi-transparent, and eventually changes to the non-display state (transparent).

Figure 13A:
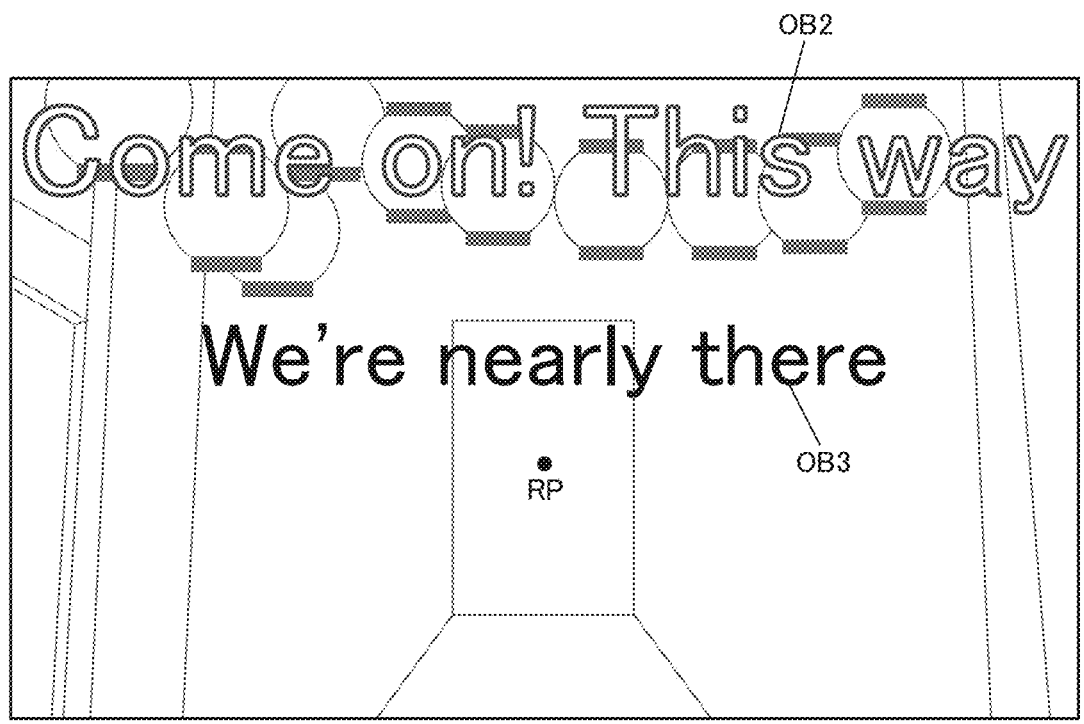
FIG. 13A and FIG. 13B are explanatory diagrams illustrating an attraction game according to the present embodiment.

Thereafter, when the user further moves toward and approaches the reference point RP of the place P1, the next disposed object OB3 is set to the display state and is displayed as shown in FIG. 13A. Compared with the disposed objects OB1 and OB2, the disposed object OB3 is disposed closer to the reference point RP. The disposed object OB3 is for example, a text message "We're nearly there". In this situation, the display mode of the disposed object OB2 changes from opaque to semi-transparent, and eventually changes to the non-display state.

Figure 13B:
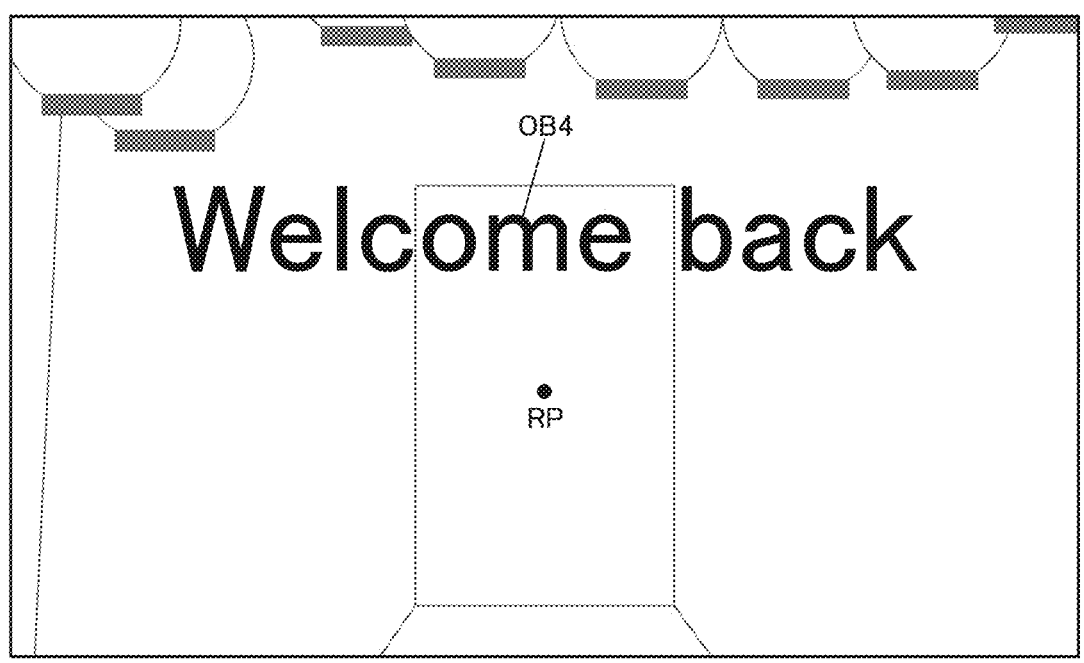

Then, when the user further moves toward and comes very close to the reference point RP of the place P1, the next disposed object OB4 is set to the display state and is displayed as shown in FIG. 13B. Compared with the disposed objects OB1, OB2 and OB3, the disposed object OB4 is disposed closer to the reference point RP. The disposed object OB4 is, for example, a text message "Welcome back". In this situation, the display mode of the disposed object OB3 changes from opaque to semi-transparent, and eventually changes to the non-display state.

As described above, the present embodiment utilizes the disposed objects OB1 to OB4 which are set based on the reference point RP, and thereby successfully and appropriately guides the user to the place P1 of the reference point RP.

Figure 14:
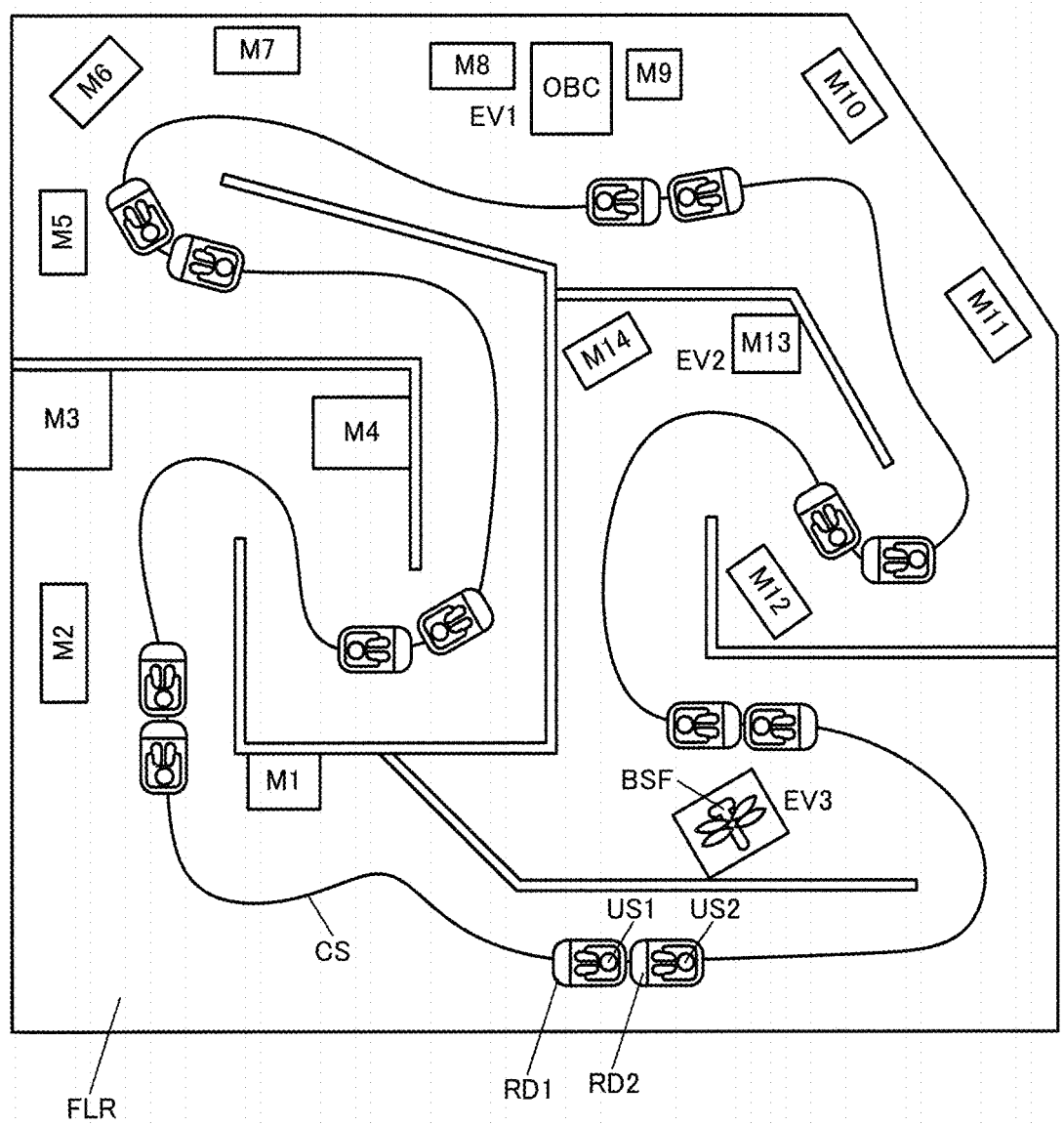
FIG. 14 is an explanatory diagram illustrating a ride-type attraction game in which a user plays a game while riding on a ride chassis.

After returning to the place P1, the user plays a ride-type attraction game whose entrance is provided in the place P1. FIG. 14 shows a play field FLR of this ride-type attraction. A course CS is provided in the play field FLR. The users US1 and US2 get on the ride chassis RD1 and RD2, and the ride chassis RD1 and RD2 move along the course CS. In areas M1 to M14 of the play field FLR, mosquitoes appear and attack the users. The users perform the hand clapping actions described above with reference to FIGS. 9A to 11B to kill the mosquitoes. Further, a ceiling object OBC collapses and falls in an event EV1 that occurs on the far side of the play field FLR. The ceiling object OBC is expressed by an object in the virtual space, and a virtual space image showing the falling ceiling is displayed on the HMD 200. In an event EV2 that occurs in the areas M13 and M14, a swarm of mosquitoes is coming over to attack. In an event EV3 that occurs as the final event, a huge boss mosquito BSF appears. The boss mosquito BSF is an object in the real space. An attraction effect is performed by superimposing an effect image in the virtual space on the boss BSF.

Figure 15A:
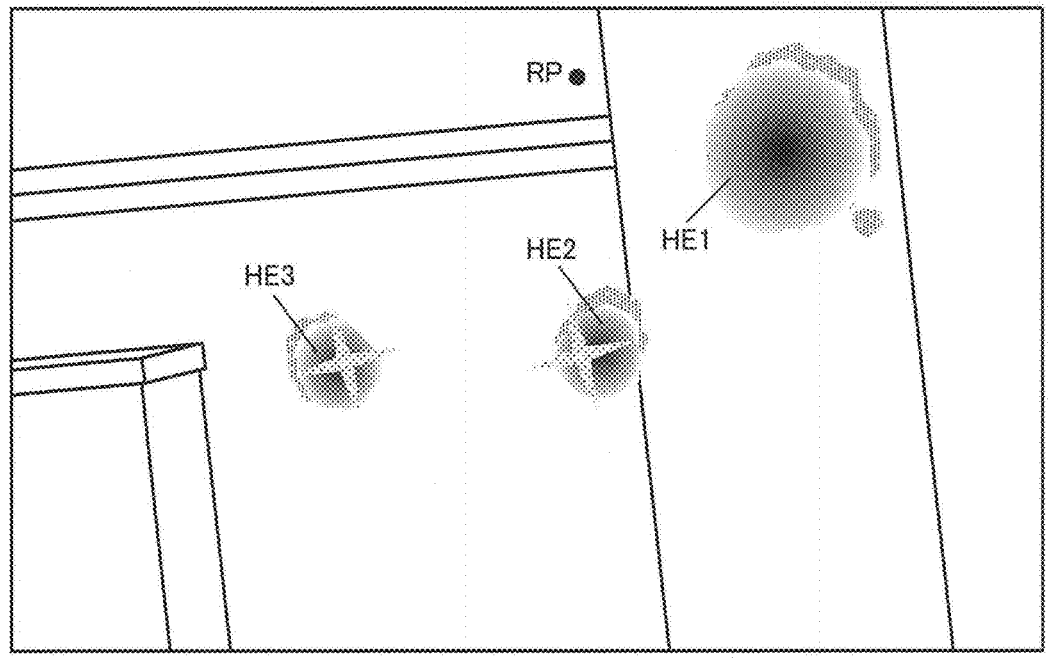
FIG. 15A and FIG. 15B are explanatory diagrams illustrating an attraction game according to the present embodiment.
Figure 15B:
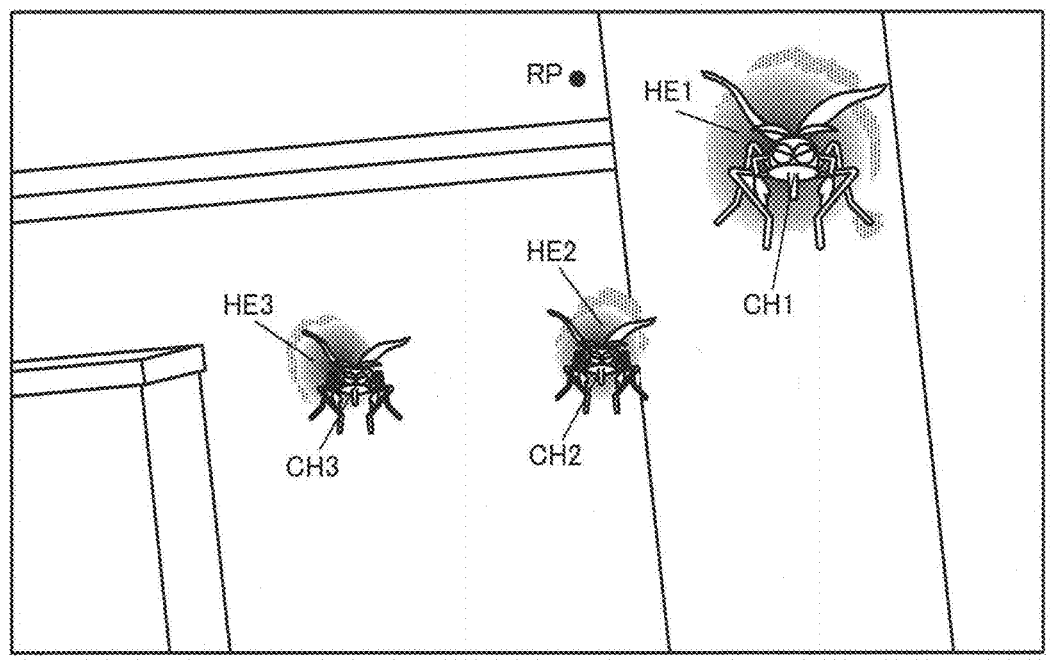

FIGS. 15A and 15B show examples of the mosquito appearance event in the play field FLR. In FIGS. 15A and 15B, MR is applied to cause holes HE1, HE2, and HE3 to appear in the real space and then cause mosquito characters CH1, CH2, and CH3 to fly out of the holes HE1, HE2, and HE3. Then, the user can perform the hand clapping actions described with reference to FIGS. 9A to 11B to kill the attacking mosquitoes. The images of the holes HE1, HE2, and HE3 are virtual space images, and the images of the characters CH1, CH2, and CH3 are also virtual space images. MR is thus realized by displaying these virtual space images superimposed on the objects in the real space.

In the present embodiment, the objects of the holes HE1 to HE3 and the objects of the characters CH1 to CH3 are disposed based on the reference point RP. For example, the real space recognition process shown in FIGS. 4A and 4B is performed with respect to the object in the real space disposed in the play field FLR of FIG. 14. Thus generated is a virtual space shown in FIGS. 15A and 15B in which virtual objects corresponding to the objects in the real space are disposed, and the reference point RP is set in the generated virtual space. Then, when the user character corresponding to the user moving by the ride chassis approaches the reference point RP, the objects of the holes HE1 to HE3 set in association with the reference point RP appear as shown in FIG. 15A, followed by appearance of the characters CH1 to CH3 from the holes HE1 to HE3. In this way, the MR images shown in FIGS. 15A and 15B may be generated without using an AR marker or the like.

Figure 16:
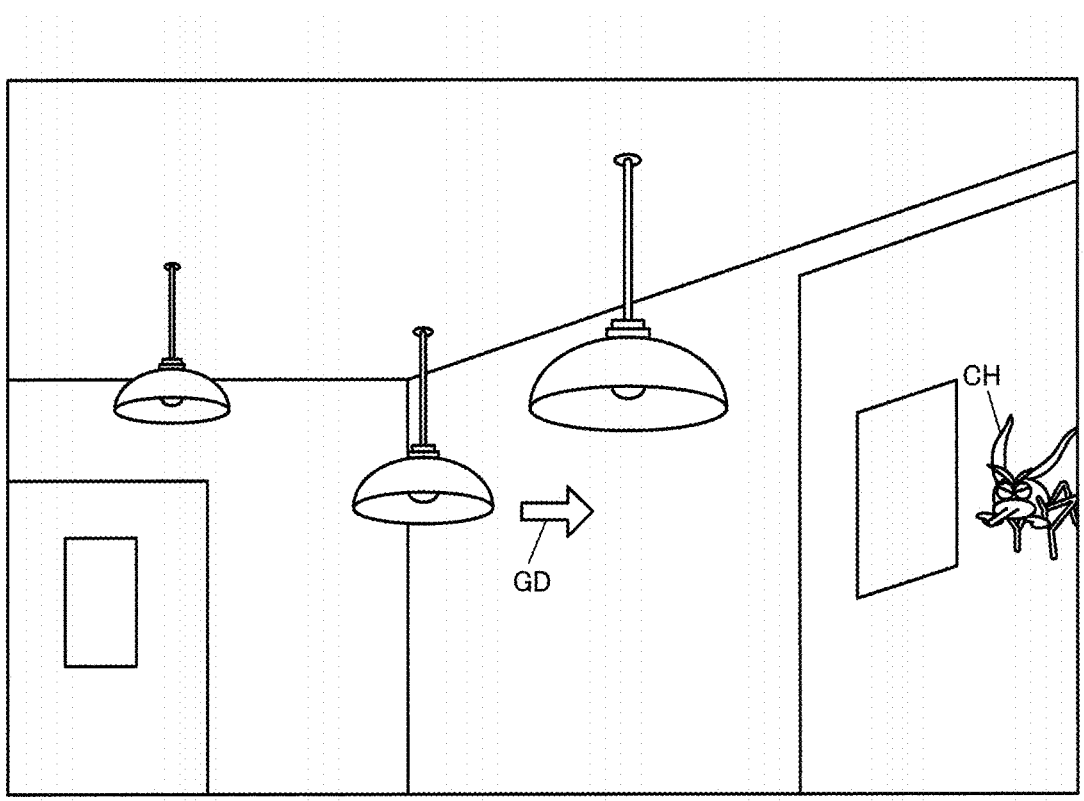
FIG. 16 is an explanatory diagram illustrating an attraction game according to the present embodiment.

A guide GD is shown in FIG. 16. The guide GD is a disposed object indicating the direction in which the character CH is present. For example, when the display area ARV of the virtual space image of the HMD 200 is small (when the viewing angle is small) as shown in FIG. 5, the image of the character CH cannot be displayed in the display area ARV unless the user looks toward the character CH. In this case, by displaying the guide GD shown in FIG. 16, when the user looks, for example, to the right, the display area ARV of the HMD 200 of FIG. 5 moves in the DR2 direction, allowing the image of the character CH to be displayed in the display area ARV. The disposed object serving as the guide GD which is disposed and displayed in the above-mentioned manner enables the user to perform a hand clapping action while looking toward the character CH, thereby killing the mosquito character CH.

The process of notifying the present position of the character CH is not limited to the process using a display object such as the guide GD shown in FIG. 16. For example, the user may be notified of the present position of the character CH by way of three-dimensional acoustic from a sound output section (headphones, speakers) provided in the HMD 200 or the like. For example, when the character CH is present on the right hand side, a three-dimensional acoustic process may be performed in a manner such that the sound generated from the character CH (for example, a buzzing sound) can be heard from the right hand side, and the sound is output from the sound output section. This arrangement can appropriately notify the user of the position of the character CH even when, as shown in FIG. 5, the HMD 200 with a small display area ARV and a small viewing angle is used.

3.2 Setting Reference Point and Hit Volume

In the present embodiment described above, the real space information is acquired by performing a recognition process with respect to the real space around the user as described with reference to FIGS. 4A and 4B. The user information including position information of the user is also acquired. Then, a virtual space corresponding to the real space is generated based on the acquired real space information. For example, a virtual space in which polygon mesh objects shown in FIG. 4B are disposed is generated. Then, as shown in FIGS. 8A, 8B, 12A to 13B, 15A and 15B, for example, the reference point RP is set in the virtual space based on the user information (position information) and the real space information, the object of the character and the disposed object are disposed in the virtual space based on the reference point RP, and an image including the image of the character and the image of the disposed object is displayed in the display section 190. For example, a virtual space image including an image of a character and/or an image of a disposed object is displayed in the display section 190 (display area ARV) of the HMD 200.

A hit volume is set based on the position of the user character (user moving body in a broad sense) in the virtual space corresponding to the user. Then, when the user performs a given input, a process with respect to the character is performed in accordance with the positional relationship between the hit volume and the character.

Figure 17A:
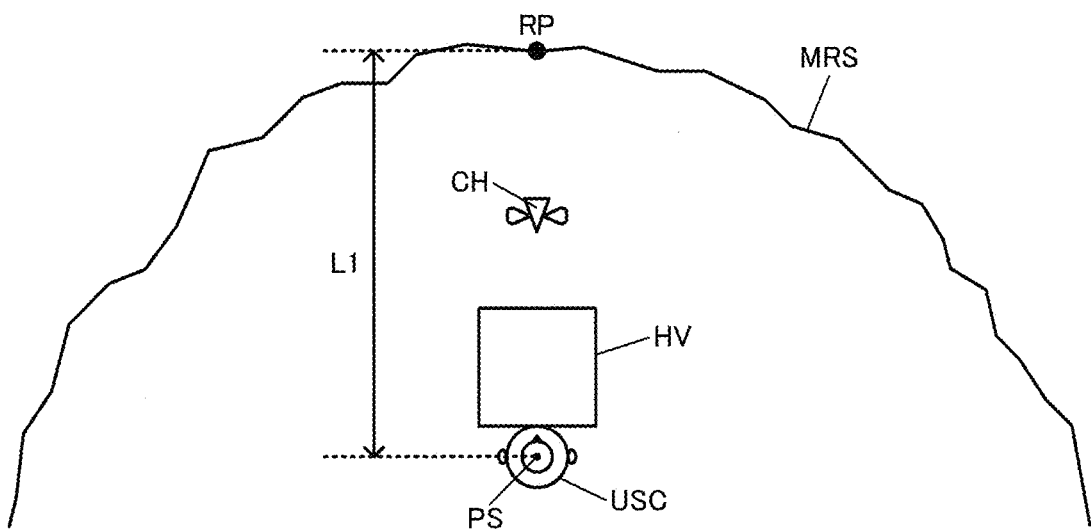
FIG. 17A and FIG. 17B are explanatory diagrams illustrating a hit process according to the present embodiment.
Figure 17B:
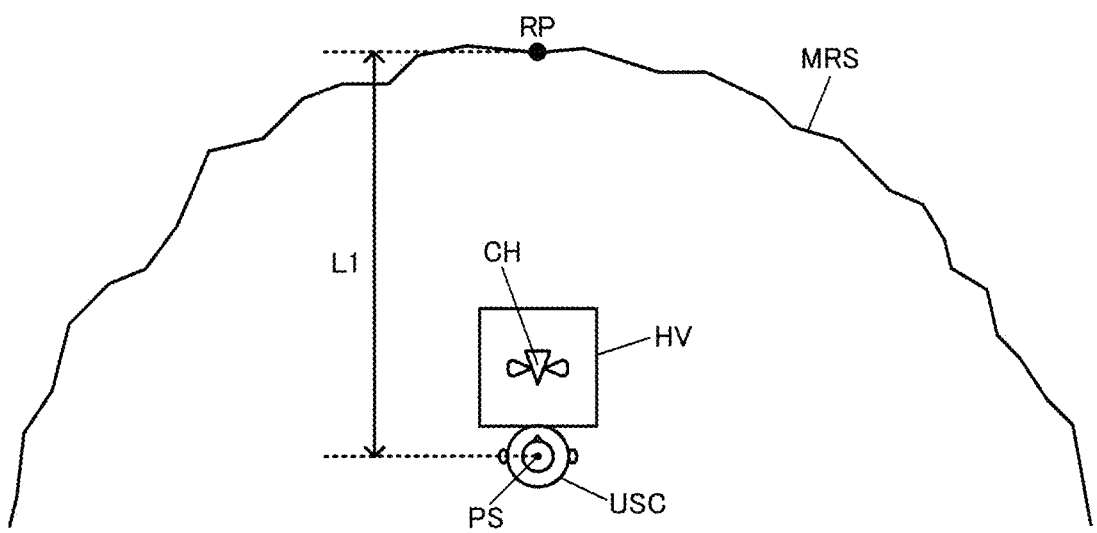

For example, in FIGS. 17A and 17B, a background object MRS (for example, an object constituted of a mesh polygon) in the virtual space corresponding to a background object (a pillar, a wall, a door, or the like) in the real space is generated based on real space information acquired by performing a real space recognition process (scanning process, mapping process). Further, the reference point RP is set based on the real space information or the like. By generating the background object MRS corresponding to the background object in the real space, the reference point RP can be set at a position corresponding to the background object in the real space. Then, the character CH is disposed based on the reference point RP. For example, the character CH is made to appear from an appearance point specified based on the reference point RP.

The reference point RP is set based on the real space information. The reference point RP designates a point or a place for setting the disposition locations of the character (CH) and the disposed objects (OB1 to OB4). The reference point RP may be identical to the disposition location (appearance location) of the character or the disposed object. Since the setting of the reference point RP is based on the real space information, the reference point RP reflects the position, shape, and the like of the object in the real space. In addition, by setting the reference point RP based on the user information including the position information and the direction information of the user, it is possible, for example, to detect the movement, the facing direction, the approach, and the like of the user, to set the reference point, and thereby to cause appearance of the character and the disposed object. For example, the reference point RP can be used as a pseudo marker or the like in MR.

In the present embodiment, a hit volume HV (hit area) is set based on the position PS of the user character USC corresponding to the user in the real space. For example, in FIGS. 17A and 17B, the hit volume HV is set on the front side of the position PS of the user character USC. Then, when the user performs a given input, the positional relationship of the hit volume HV and the character CH is determined. Referring to FIGS. 9A to 11B as an example, a hand clapping action by the user is determined as a given input performed by the user. Then, the positional relationship between the hit volume HV and the character CH is determined at the time of the given input, i.e., the hand clapping action.

For example, it is assumed that the user performs a hand clapping action when the positional relationship between the hit volume HV and the character CH is as shown in FIG. 17A. In this situation where the position of the character CH is not within the hit volume HV, it is determined that the user's attack by hand clapping did not hit the character CH.

On the other hand, it is assumed that the user performs a hand clapping action when the positional relationship between the hit volume HV and the character CH is as shown in FIG. 17B. In this situation where the position of the character CH is within the hit volume HV, it is determined that the user's attack by hand clapping has hit the character CH. Then, a process of, for example, destroying or eliminating the character CH is performed as a process with respect to the character CH. In this way, as shown in FIGS. 11A and 11B, it is possible to perform a process of attacking the character CH coming very close to the user, and thereby eliminating or destroying the character CH.

In FIGS. 17A and 17B, a second hit volume may be set based on the position of the character CH. Then, the hit determination process may be conducted by performing a crossing determination process to determine whether the hit volume HV that is set based on the position PS of the user character USC and the second hit volume that is set based on the position of the character CH cross each other.

As described above, in the present embodiment, the virtual space corresponding to the real space is generated by the real space information acquired based on the real space recognition process, thereby setting the reference point RP. In this way the reference point RP can be set at a position corresponding to that in the real space. In addition, by setting the reference point RP using the user information including the position information of the user, when, for example, a user character corresponding to the user comes closer, it is possible to set the reference point RP, and to dispose and cause appearance of the character CH at a place specified by the reference point RP. Further, in the present embodiment, a process with respect to the character CH is performed by determining the positional relationship between the character CH and the hit volume HV that is set based on the position of the user character USC. This makes it possible to achieve interaction between the user and the virtual character CH, which is made to appear based on the reference point RP, thereby enabling, for example, a hit determination process that determines whether or not an attack of the user hits. Therefore, it becomes possible to set a virtual space corresponding to the real space and dispose the character CH, and to thereby realize interaction with the character CH based on the input of the user, thereby achieving an interactive game using the real space information. More specifically, it becomes possible to achieve a simulation system capable of suitable interaction between a user and a character by effectively utilizing real space information.

In the present embodiment, the hit volume HV may be set with respect to a body part of the user or belongings of the user.

Figure 18A:
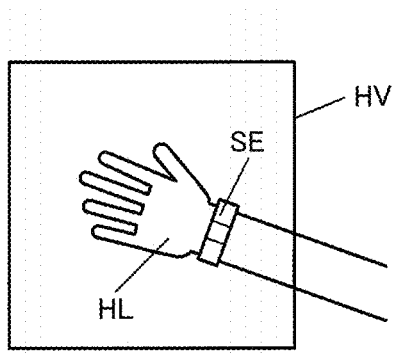
FIG. 18A to FIG. 18C are explanatory diagrams illustrating setting of a hit volume and a process of detecting a movement of a user.

For example, in FIG. 18A, the hit volume HV is set with respect to a hand HL that is a body part of the user. For example, a hit volume HV is set to include the hand HL of the user. When the user moves the hand HL, the hit volume HV moves in linkage with the hand HL. The movement of the hand HL of the user can be detected using an arm sensor SE (detection section in a broad sense) worn by the user. For example, the movement of the hand HL is detected using an acceleration sensor, a triaxial gyro sensor, or the like incorporated in the arm sensor SE, and the hit volume HV is moved by following the movement of the hand HL.

Figure 18B:
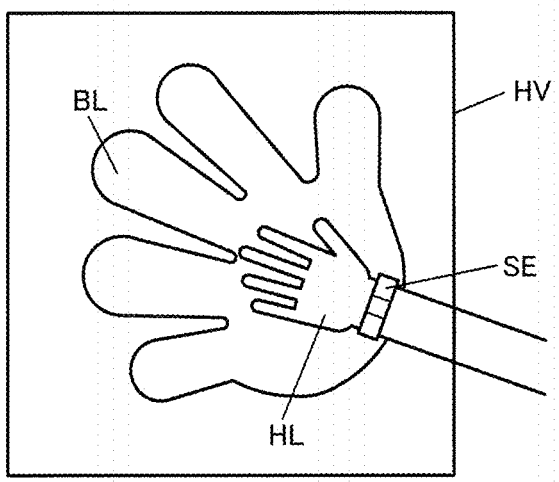

Further, in FIG. 18B, a hit volume HV is set with respect to the belongings BL of the user. For example, a hit volume HV is set to include the belongings BL of the user. When the user moves the belongings BL, the hit volume HV moves in linkage with the belongings BL. The movement of the belongings BL is detected using the arm sensor SE or the like, and the hit volume HV is moved by following the movement of the belongings BL. In this case, a movement detection sensor such as the arm sensor SE may be attached to the belongings BL to detect the movement of the belongings BL. Further, the belongings BL, which has a large hand shape in FIG. 18B, may have various shapes. For example, the belongings BL may have a shape of a sword, a bar, an axe, or a gun.

In this way, by setting the hit volume with respect to a body part or belongings of the user, when the user moves the body part or the belongings in the real space, the hit volume moves in linkage with the body part or the belongings. This makes it possible to perform a hit determination process or the like by using the hit volume that moves in linkage with a body part or belongings of the user, thus improving the virtual reality for the user.

Figure 18C:
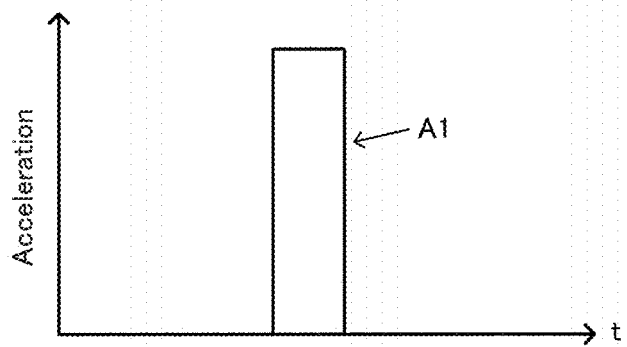

Further, the present embodiment determines whether or not the user performs a given input based on information from the detection section 162 that detects the movement of the user. For example, as shown in FIGS. 9A to 11B, the detection section 162 is used to detect whether or not the user has performed a given input by a certain action such as hand clapping. For example, the detection section 162 may be implemented by the arm sensor SE shown in FIGS. 18A and 18B. Specifically, the detection is performed using an acceleration sensor incorporated in the arm sensor SE. FIG. 18C shows a detection result of the acceleration sensor when the user performs a given input. When the user performs a hand clapping action, the moving hand stops at a rapid acceleration; therefore, the acceleration sensor provides a detection result as indicated by A1 in FIG. 18C (which is actually acceleration in the negative direction). Based on this detection result, it is determined that the user has performed a given input by performing a hand clapping action. Then, the positional relationship between the hit volume HV and the character CH at the time when the given input is performed may be determined.

In this way, it is possible to detect the actual movement of the user in the real space, to determine whether or not the user has performed a given input, and thereby to achieve a hit determination process or the like using a hit volume or the like. This enables the user to attack the character by actually moving a body part or belongings, thus further improving the virtual reality of the user.

The process of detecting whether or not the user has performed a given input is not limited to the process using an acceleration sensor. For example, a motion sensor (gyro sensor or the like) other than the acceleration sensor may be used to detect a motion when the user performs an input; alternatively, an external device such as an external camera may be used to detect a motion of a body part or belongings of the user to thereby detect whether or not the user performs a given input. It is also possible to detect an operation input by the user using the operation section 160 such as a game controller to thereby detect whether or not the user has performed a given input.

Further, in the present embodiment, a hit volume is set between the reference point and the user character in the virtual space corresponding to the user. When the user performs a given input, a process with respect to the character is performed in accordance with the positional relationship between the hit volume and the character.

Figure 19A:
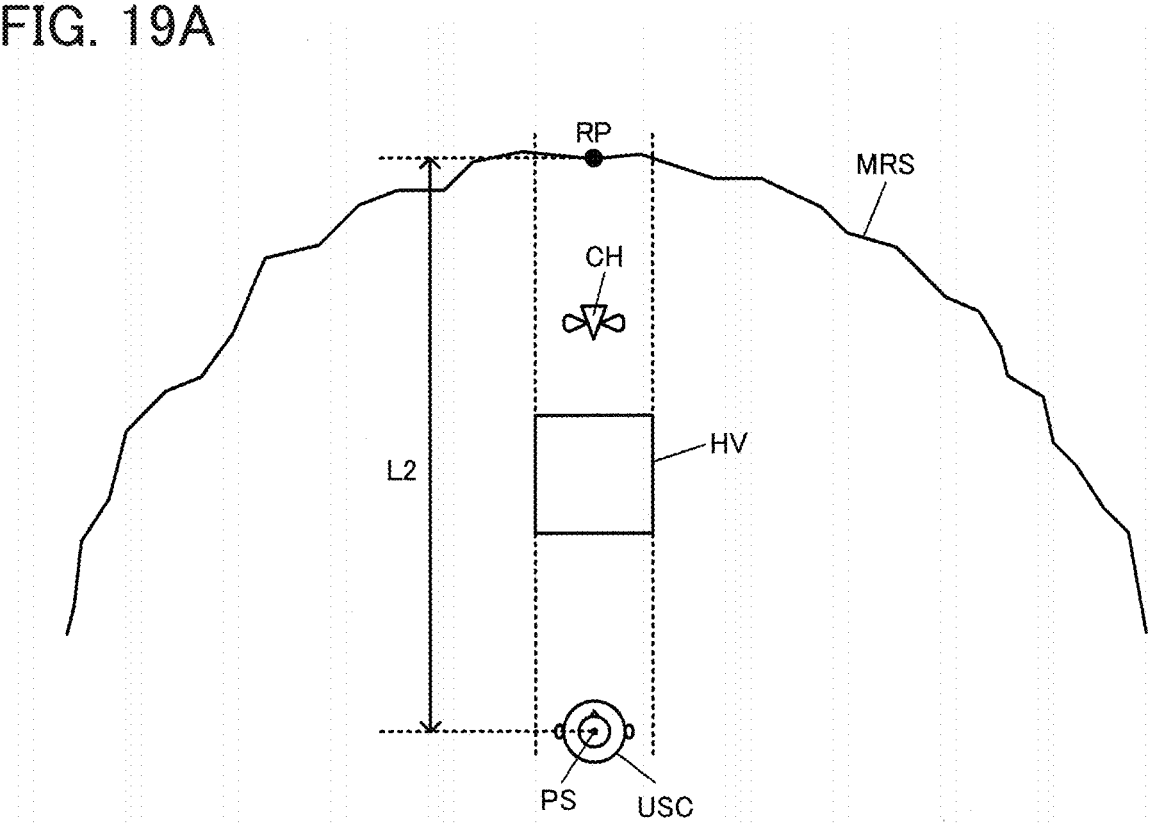
FIG. 19A and FIG. 19B are explanatory diagrams illustrating a hit process according to the present embodiment.

For example, in FIG. 19A, a hit volume HV is set between the user character USC and the reference point RP. For example, the hit volume is set at an intermediate point of a line connecting the user character USC and the reference point RP. When the user character USC is looking toward the reference point RP, for example, the hit volume HV is set on a point extended from the line of sight. Then, when the user performs a given input, the positional relationship between the hit volume HV and the character CH is determined. For example, as shown in FIGS. 9A to 11B, the positional relationship between the hit volume HV and the character CH is determined at the time when the given input, i.e., the hand clapping action, is performed.

It is then assumed that the user performs a hand clapping action when the positional relationship between the hit volume HV and the character CH is as shown in FIG. 19A. In this situation where the position of the character CH is not within the hit volume HV, it is determined that the user's attack by hand clapping did not hit the character CH.

Figure 19B:
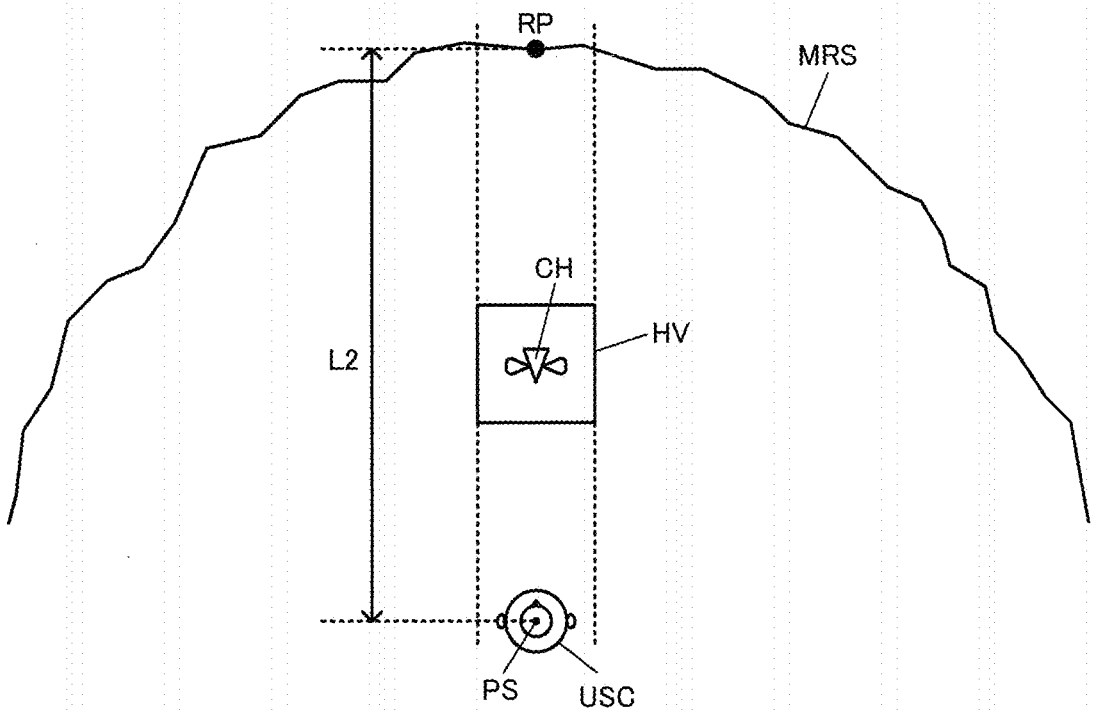

On the other hand, it is assumed that the user performs a hand clapping action when the positional relationship between the hit volume HV and the character CH is as shown in FIG. 19B. In this situation where the position of the character CH is within the hit volume HV it is determined that the user's attack by hand clapping has hit the character CH. Then, a process of, for example, destroying or eliminating the character CH is performed as a process with respect to the character CH. In this way, as shown in FIGS. 9A to 11, it is possible to perform a process of attacking the character CH at a position distant from the user, and thereby eliminating or destroying the character CH.

In the examples of FIGS. 19A and 19B, the hit determination process may be conducted by setting a second hit volume based on the position of the character CH and performing a crossing determination process with respect to the hit volume HV that is set between the user character USC and the reference point RP and the second hit volume that is set based on the position of the character CH. When the character CH approaches the user character USC beyond the range of the hit volume HV from the position shown in FIG. 19B, it may be determined that the user character USC has been attacked by the character CH. Accordingly, it is possible to damage the status of the user character USC, reduce the hit points of the user character USC, or perform an effecting process using an effect indicating that the user character USC has been attacked.

According to the method of FIGS. 19A and 19B, even when the position of the reference point RP and the position of the character CH disposed based on the reference point RP are far away from the user character USC, it is possible to interact with the character CH. More specifically by setting the hit volume HV between the reference point RP and the user character USC, it is possible to perform a hit process with respect to the character CH located at a distant position, thereby enabling a suitable interaction between the user and the character in MR.

Further, in the present embodiment, when the user character USC and the reference point RP have a first distance relationship, the hit volume HV is set based on the position of the user character USC, and, when the user performs a given input, a process with respect to the character CH is performed in accordance with the positional relationship between the hit volume HV and the character CH.

For example, as shown in FIGS. 17A and 17B, when the user character USC and the reference point RP have a first distance relationship in which the distance L1 between them is short, the hit determination process is performed by setting the hit volume HV based on the position of the user character USC. When the character CH appears in a place close to the user character USC, this arrangement enables an interaction in which an attack of the user character USC hits the character CH or a like interaction. For example, as shown in FIGS. 11A and 11B, it is possible to perform a process in which the user attacks the character CH in proximity to the user by actually hitting it with the belongings BL and BR or the hands HL and HR, thereby eliminating or destroying the character CH. More specifically, it is possible to express an MR image of hitting the character CH, which is an object in the virtual space, using the belongings BL and BR and the hands HL and HR, which are objects in the real space.

It may also be arranged such that a body part object or a belonging object corresponding to a body part, such as a hand, of the user or belongings of the user are displayed in the virtual space. For example, a body part object or a belonging object is displayed as a part of the user character. Then, each time the user performs a hand clapping action or the like, the size of the body part object or the belonging object may be gradually increased. In the case where a large number of characters such as mosquitoes is generated (for example, event EV2 in FIG. 14), this arrangement enables a game attraction effect of, for example, attacking the large number of characters with an enlarged hand.

On the other hand, when the user character USC and the reference point RP have a second distance relationship, the hit volume HV is set between the user character USC and the reference point RP, and, when the user performs a given input, a process with respect to the character CH is performed in accordance with the positional relationship between the hit volume HV and the character CH.

For example, as shown in FIGS. 19A and 19B, when the user character USC and the reference point RP have a second distance relationship in which the distance L2 between them is long, the hit determination process is performed by setting the hit volume HV between the user character USC and the reference point RP. Even when the character CH appears in a place distant from the user character USC, as shown in FIGS. 9A to 10, this arrangement enables an interaction in which an attack of the user character USC hits the character CH or a like interaction. For example, as shown in FIGS. 9A to 10, it is possible to perform a process in which an attack effect AG generated by a hand clapping action of the user is made to hit the character CH located at a distant place, thereby eliminating or destroying the character CH.

In the present embodiment, as a process with respect to a character, a character eliminating process, a character destroying process, a character display mode changing process, or a notification process regarding the character is performed.

Figure 20A:
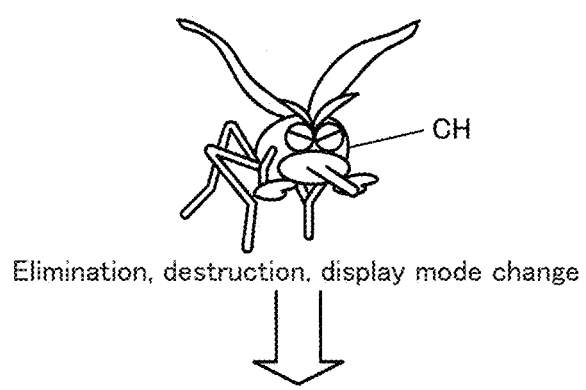
FIG. 20A and FIG. 20B are explanatory diagrams illustrating a process with respect to a character.

For example, FIG. 20A shows a process performed with respect to the character CH, such as an eliminating process, a destroying process, or a display mode changing process for the character CH. For example, in a state where the character CH is positioned within the hit volume HV as shown in FIGS. 17B and 19B, if an input such as hand clapping is performed by a user as shown in FIGS. 9A to 11B, an eliminating process, a destroying process, or a display mode changing process for the character CH is performed. The character CH eliminating process is a process of hiding the character CH as a virtual space image. For example, the character CH is deleted from the list of displayed objects. The character CH destroying process can be performed by, for example, switching the object of the character CH to an object representing a destroyed state. Alternatively, the character CH destroying process may be a process of displaying an image effect representing the destruction. The process of changing the display mode of the character CH is, for example, a process of changing the color, brightness, semi-transparency, texture, or the like of the character CH. For example, the display mode is changed to indicate that the character CH has been attacked by the user. Alternatively, a process with respect to the character CH may be a notification process using sound effects or the like shown in FIG. 20B. For example, a sound effect for notifying that the character CH has been attacked and damaged is output. In this case, a three-dimensional acoustic process is performed so that a sound effect can be heard from the position of the character CH. Alternatively, a process with respect to the character CH may be a vibration notification process using a vibration device. For example, when it is determined that the attack hits the character CH, a vibration device incorporated in a game controller possessed by the user is vibrated. Alternatively, the play field FL of FIG. 6 or the play field FLR of FIG. 14 may be provided with a sensory device such as a vibration device or an air gun, and the sensory device may be used to perform a notification process to notify that the character CH has been attacked and damaged.

Further, for example, when the attack of the user has failed, the failure of the attack may be notified by an effecting process or a notification process. For example, an effect image indicating the failure of the attack is displayed, or a sound effect is output. For example, when the character CH is positioned within the hit volume HV as shown in FIGS. 17B and 19B, but if the user does not perform the input of hand clapping at this timing, the failure of the attack is notified by an effecting process or a notification process. Alternatively, in FIG. 19B, when the character CH approaches the user character USC beyond the range of the hit volume HV, the failure of the attack may be notified by an effecting process or a notification process.

Further, in the present embodiment, the character disposition timing is determined in accordance with the distance between the user character and the reference point.

Figure 21A:
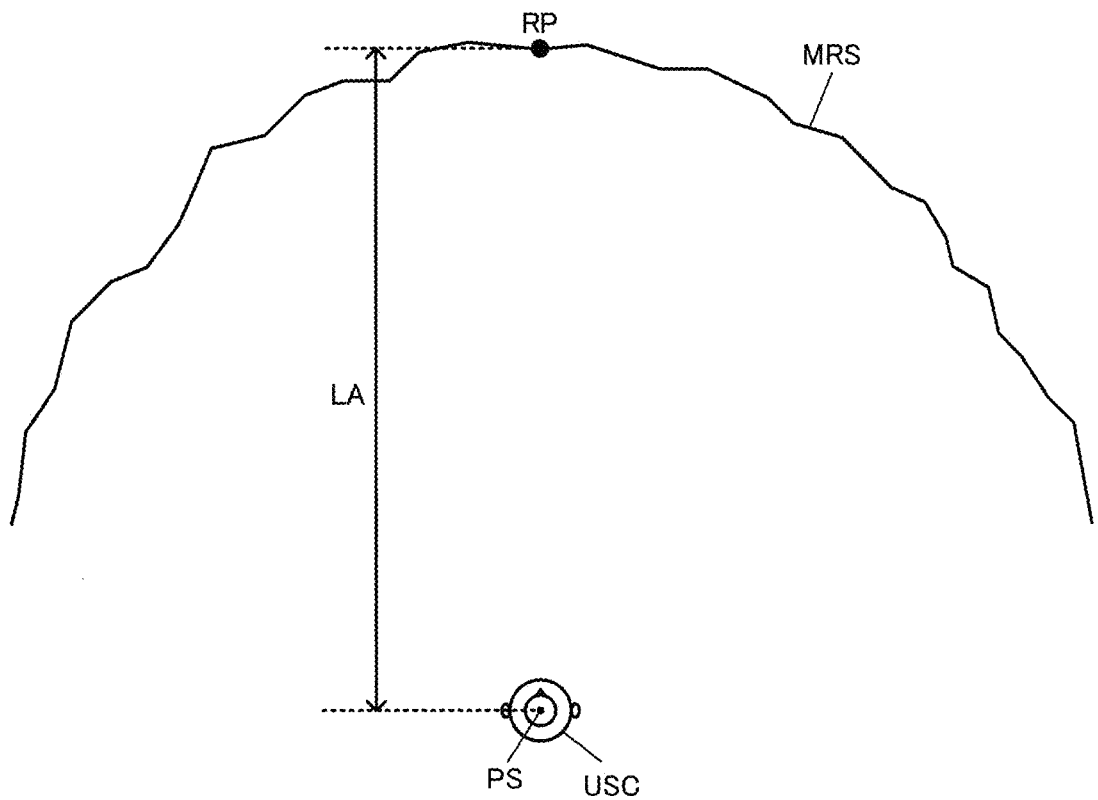
FIG. 21A and FIG. 21B are explanatory diagrams illustrating a process of determining a character disposition timing based on a distance between a user character and a reference point.
Figure 21B:
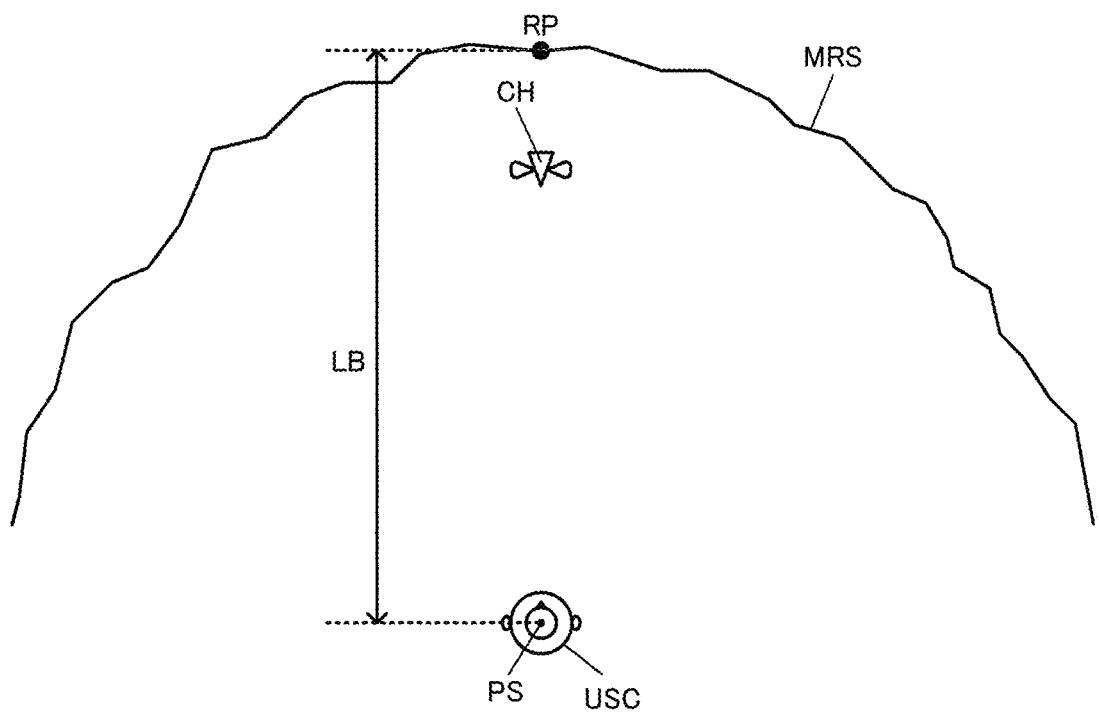

For example, in FIG. 21A, the distance LA between the user character USC and the reference point RP is long, which means the user character USC is positioned far away from the reference point RP. In this case, the character CH does not appear at the position corresponding to the reference point RP. In contrast, in FIG. 21B, the distance LB between the user character USC and the reference point RP is shorter than the distance LA in FIG. 21A, which means the user character USC is close to the reference point RP. When the user character USC and the reference point RP have such a positional relationship (proximity relationship), the character CH is disposed at a position corresponding to the reference point RP, and the character CH is made to appear.

In this way, it is possible to reflect the distance relationship between the user character USC and the reference point RP in the appearance of the character CH corresponding to the reference point RP. As a result, it is possible to use the reference point RP as a pseudo AR marker for causing the appearance of the character CH. For example, the present embodiment performs a real space recognition process, and sets a reference point based on the real space information acquired by the recognition process. Specifically, in FIGS. 21A and 21B, a background object MRS corresponding to a background object in the real space is generated and disposed in the virtual space, and the reference point RP is set with respect to the background object MRS. Then, a disposition timing of the character CH is determined in accordance with the distance between the user character USC and the reference point RP. This makes it possible to perform a process as if the disposition timing of the character CH were determined in accordance with the distance between the background object in the real space and the user, thereby enabling a character CH appearance process suitable for MR.

Further, the present embodiment sets the reference point in accordance with information of the situation of the user, information of the situation of the user character, information of the situation or the type of the character, or information of the game situation. Furthermore, the present embodiment acquires environment information in the real space, and sets the reference point according to the environment information. That is, the present embodiment can variably change the setting of the reference point based on various types of information.

Figure 22:
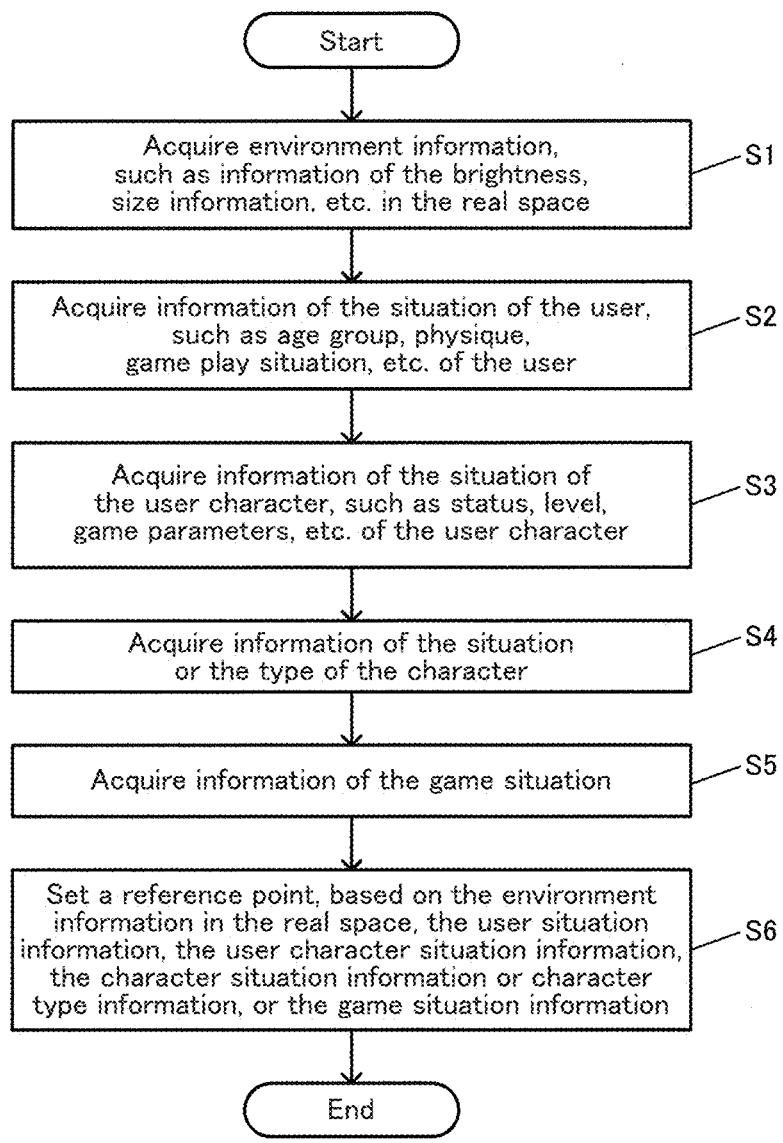
FIG. 22 is a flowchart showing an example of a process of setting a reference point based on environment information, information of situations of a user, a user character, and a character, and information of a game situation.

FIG. 22 is a flowchart showing a reference point setting process. First, environment information such as brightness information and size information of the real space is acquired (step S1). The brightness information and the size information of the real space are, for example, brightness information and size information of the play field FL of FIG. 6 or the play field FLR of FIG. 14. For example, the brightness information is brightness information of illumination or the like in the play field FL or FLR. For example, weak illumination is determined to be dark, and strong illumination is determined to be bright. The size information is information serving as an index of the size of the play field FL or FLR. For example, the recognition range, the accuracy and reliability of the recognition, and the like in the real space recognition process described with reference to FIGS. 4A and 4B vary depending on the size and the brightness of the play fields FL and FLR.

Next, information of the situation of the user, such as the age group, the physique, the game play situation and the like of the user, is acquired (step S2). The age group of the user is, for example, information indicating whether the user is a child or an adult. The age group of the user may also be information indicating whether the user is young or old. The physique is information of, for example, the height of the user. The physique information may also be the weight of the user. The game play situation is, for example, the level of the user's game play skill (beginner, intermediate, or advanced), the situation of the user's equipment, the previous game scores of the user, the number of games played by the user, the frequency of the game played by the user, various statuses of the user in the game, the situations of the friends of the user, and the like.

Next, the information of the situation of the user character, such as the status, the level, the game parameters and the like of the user character, is acquired (step S3). The status of the user character is a situation of, for example, the offensive power, the defensive power, the durability, or the equipment of the user character. The level of the user character represents a level, such as an experience point, of the user character in the game. The game parameters of the user character are various parameters of the user character used in the game process.

Next, information of the situation of the character or information of the type of the character are acquired (step S4). The information of the situation of the character is information of for example, the status, the level, and the game parameters of the character. The information of the type of the character is information of the particular type of the character. For example, in the case where the character to appear is an insect character other than a mosquito, an animal character, or a monster character, the information of the type of the character is information indicating the type of the insect, the animal, or the monster.

Next, information of the game situation is acquired (step S5). The information of the game situation includes a progress situation in the game, an event occurrence situation in the game, a difficulty level of the game, a game stage completion situation, a game map situation, and the like.

Then, the reference point is set based on the environment information in the real space, the information of the situation of the user, the information of the situation of the user character, the information of the situation of the character, the information of the type of the character, or the information of the game situation thus acquired (step S6).

For example, if the environment such as illumination of the real space is dark, the recognition range in the real space recognition process shown in FIGS. 4A and 4B is narrowed, and the accuracy and reliability of the recognition are reduced. Therefore, when it is determined that the environment is dark, the reference point is set at a position close to the user character, or the setting interval of the reference points is narrowed. For example, a sub reference point is set between the main reference point and the user character. Alternatively, instead of the real space information acquired in real time by a real space recognition process, the real space information which was acquired by a recognition process in the past and accumulated in the real space information storage section 171 may be used to set the reference point.

Further, the setting position of the reference point is changed according to the age group or the physique of the user. For example, if the user is a child or has a short height, the reference point is set at a low position. In contrast, for an adult user or a tall user, the reference point is set at a position higher than that for a child or a short user. Alternatively, the setting position, the setting number, the setting interval, or the setting mode of the reference point is changed according to whether the user is a beginner or an advanced player, or according to the number or the frequency of gameplay of the user. For example, if the user is a beginner, the reference point is set to make the difficulty level lower, and if the user is an advanced player, the reference point is set to make the difficulty level higher. For a user who has played the game many times or at a high frequency, the reference point is set to make the gameplay more advantageous to the user, as a privilege.

Further, the setting position, the setting number, the setting interval, or the setting mode of the reference point is changed in accordance with the status such as the offensive power, defensive power, equipment, or endurance of the user character, the level, or various game parameters. For example, the setting of the reference point is changed according to whether the ability of the user character is high or low, or whether the user has predetermined equipment. Alternatively, the setting position, the setting number, the setting interval, or the setting mode of the reference point is changed in accordance with the information of the situation of the character or the information of the type of the character. For example, the setting of the reference point is changed according to the status such as the offensive power, defensive power, equipment, or endurance of the character. Alternatively the setting position or the like of the reference point is changed according to whether the shown character is the first type (for example, the first type of insect, animal, or monster) or the second type.

Further, the setting position, the setting number, the setting interval, or the setting mode of the reference point is changed according to the game situation. For example, the setting of the reference point is changed according to the progress situation in the game or the event occurrence situation. For example, referring to FIG. 14, if the collapse event of the ceiling object OBC has occurred, it is not preferable to set the reference point on the far side of broken pieces of the ceiling object OBC. Therefore, the reference point is set on the near side of the broken pieces. Alternatively, the setting position, the setting number, the setting interval, or the like of the reference point is changed according to the difficulty level of the game. For example, as the difficulty level of the game gets higher, the setting of the reference point is changed to make completion of the game more difficult.

The above-mentioned arrangements enable appropriate setting of the reference point according to the environment of the real space, the situation of the user, the situation of the user character, the situation or the type of the character, or the game situation.

Further, in the present embodiment, the hit volume is changed according to the position of the reference point. For example, the size, the shape, the disposition location or the like of the hit volume is changed according to the position of the reference point.

Figure 23:
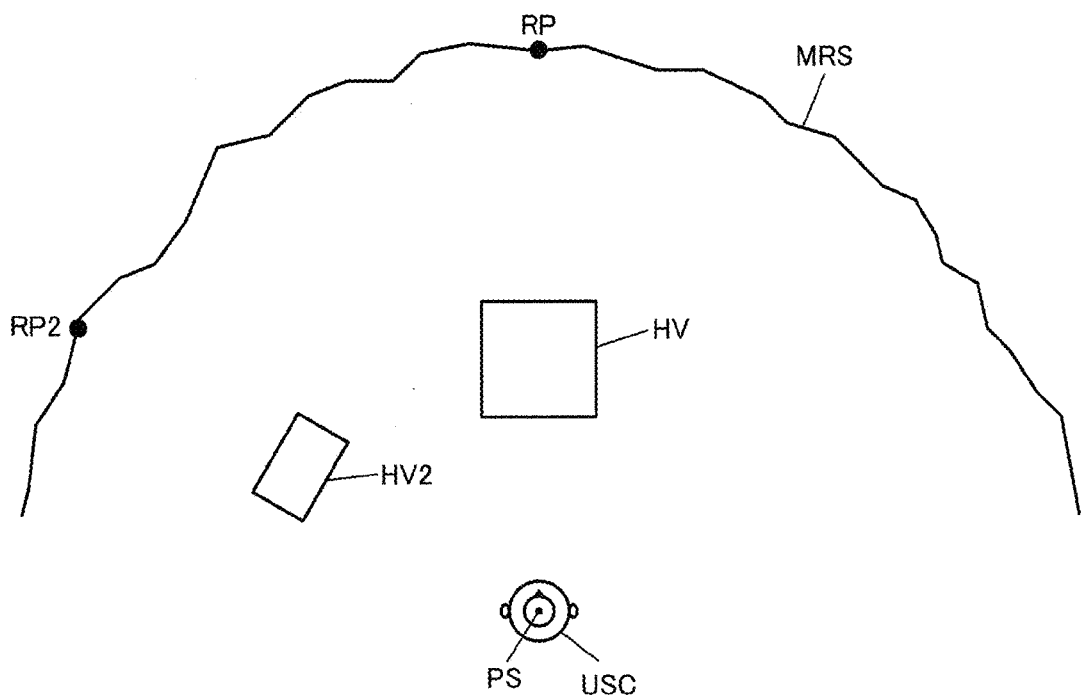
FIG. 23 is an explanatory diagram illustrating a process of changing a hit volume according to the position of a reference point.

For example, in FIG. 23, the hit volume HV is set with respect to the reference point RP located in the front direction (line-of-sight direction) of the user character USC, and the hit volume HV2 is set with respect to the reference point RP2 located in the obliquely left direction of the user character USC. The hit volume HV that is set in the front direction of the user character USC is set to have a size larger than the hit volume HV2 that is set in the obliquely left direction. This setting makes it easy to attack a character such as a mosquito coming from the front direction, and makes it difficult to attack a character coming from any other direction than the front direction, such as the obliquely left direction. Conversely, it is possible to modify the setting, for example, by reducing the size of the hit volume that is set in the front direction and increasing the size of the hit volume that is set in any other direction than the front direction.

Figure 24A:
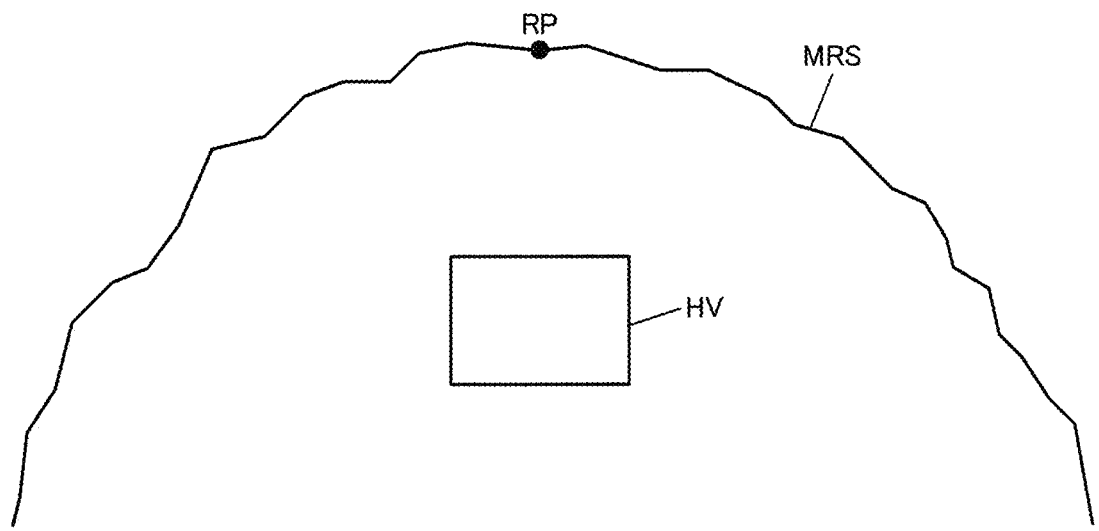
FIG. 24A and FIG. 24B are explanatory diagrams illustrating a process of changing a hit volume according to the position of a reference point.
Figure 24B:
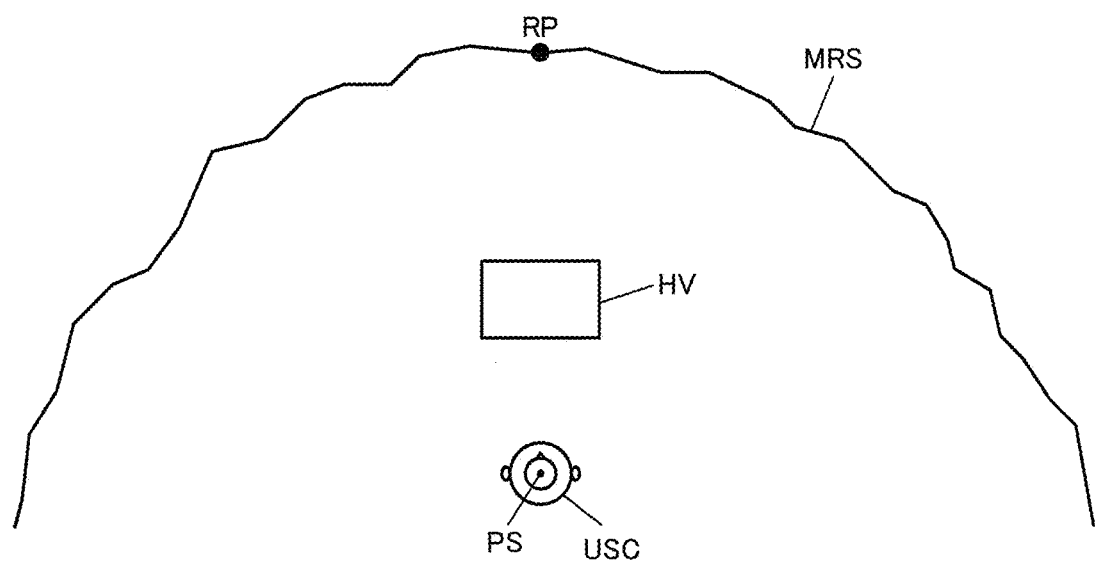

Further, in FIG. 24A, the distance between the reference point RP and the user character USC is long. In this case, the hit volume HV is set to have a large size. On the other hand, in FIG. 24B, the distance between the reference point RP and the user character USC is short. In this case, the hit volume HV is set to have a small size. For example, the size of the hit volume is changed in accordance with the distance between the reference point RP and the user character USC. As a result, when the reference point RP is distant from the user character USC and a character such as a mosquito appears in a distant place as shown in FIG. 24A, the hit volume HV is set to have a large size, thereby facilitating an attack on the character located in a distant place. Further, as the user character USC approaches the reference point RP, the size of the hit volume HV is reduced and set to a normal size.

By thus changing the hit volume according to the position of the reference point, it is possible to set an appropriate hit volume according to, for example, the positional relationship between the user character and the reference point.

Further, in the present embodiment, the hit volume is changed in accordance with information of the situation of the user, information of the situation of the user character, information of the situation or the type of the character, or information of the game situation.

Figure 25:
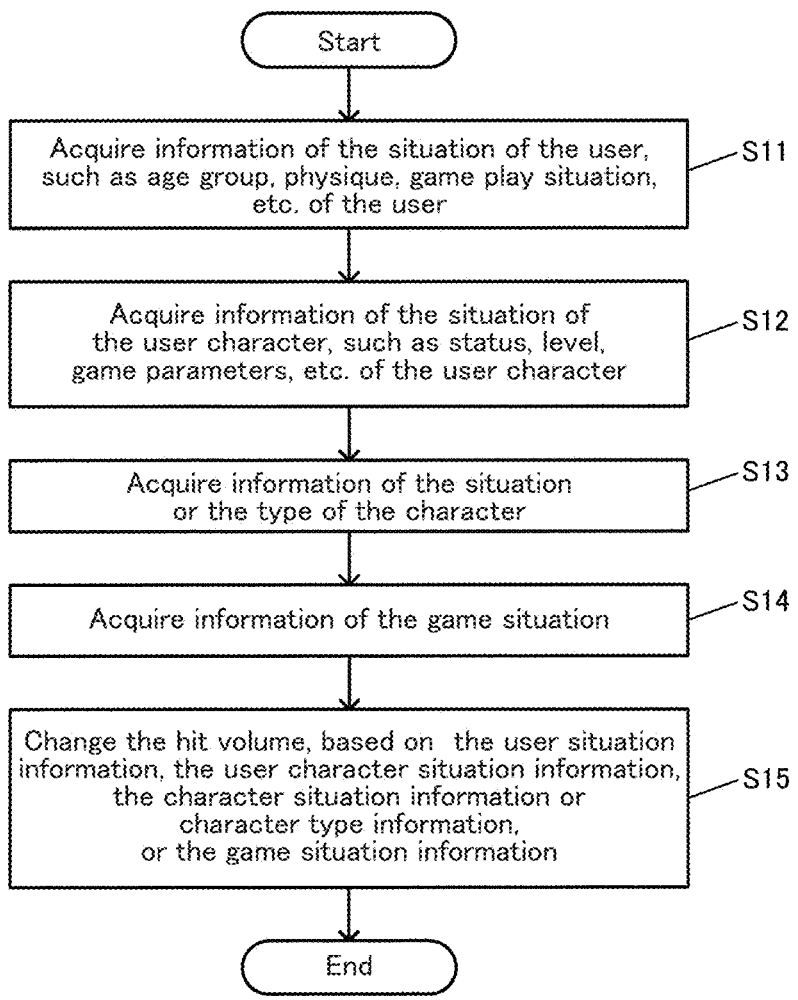
FIG. 25 is a flowchart showing an example of a process of changing a hit volume based on information of situations of a user, a user character, and a character, and information of a game situation.

FIG. 25 is a flowchart showing a hit volume setting process. First, information of the situation of the user, such as the age group, the physique, the game play situation and the like of the user, is acquired (step S11). Next, information of the situation of the user character, such as the status, the level, the game parameters and the like of the user character, is acquired (step S12). Further, information of the situation or the type of the character is acquired (step S13). Further, information of the game situation is acquired (step S14). The information of the situation of the user, the information of the situation of the user character, the information of the situation or the type of the character, or the information of the game situation are as described above.

Further, the hit volume is changed based on the information of the situation of the user, the information of the situation of the user character, the information of the situation or the type of the character, or the information of the game situation (step S15). For example, the size, the shape, the disposition location or the like of the hit volume is changed according to these information items.

For example, the hit volume is changed according to the age group or the physique of the user. For example, if the user is a child or has a short height, the hit volume is set at a low position. In contrast, for an adult user or a tall user, the hit volume is set at a position higher than that for a child or a short user. Alternatively, the size, the shape, or the disposition location of the hit volume is changed according to whether the user is a beginner or an advanced player, or according to the number or the frequency of gameplay of the user. For example, if the user is a beginner, the hit volume is set to make the difficulty level lower, and if the user is an advanced player, the hit volume is set to make the difficulty level higher. For a user who has played the game many times or at a high frequency, the hit volume is set to make the gameplay more advantageous to the user, as a privilege.

Further, the size, the shape, or the disposition location of the hit volume is changed in accordance with the status such as the offensive power, defensive power, equipment, or endurance of the user character, the level, or various game parameters. For example, the hit volume is changed according to whether the ability of the user character is high or low, or whether the user has predetermined equipment. The hit volume may also be changed in accordance with the information of the situation or the type of the character. For example, the hit volume is changed according to the status such as the offensive power, defensive power, equipment, or endurance of the character. Alternatively, the size, the shape, or the disposition location of the hit volume is changed according to whether the shown character is the first type or the second type.

Further, the size, the shape, or the disposition location of the hit volume is changed according to the game situation. For example, the hit volume is changed according to whether or not a predetermined event has occurred. The hit volume may also be changed according to the difficulty level of the game. For example, as the difficulty level of the game gets higher, the size, the shape, or the disposition location of the hit volume is changed to make completion of the game more difficult.

The above-mentioned arrangements enable appropriate setting of the hit volume according to the situation of the user, the situation of the user character, the situation or type of the character, or the game situation.

4. Process Details

Figure 26:
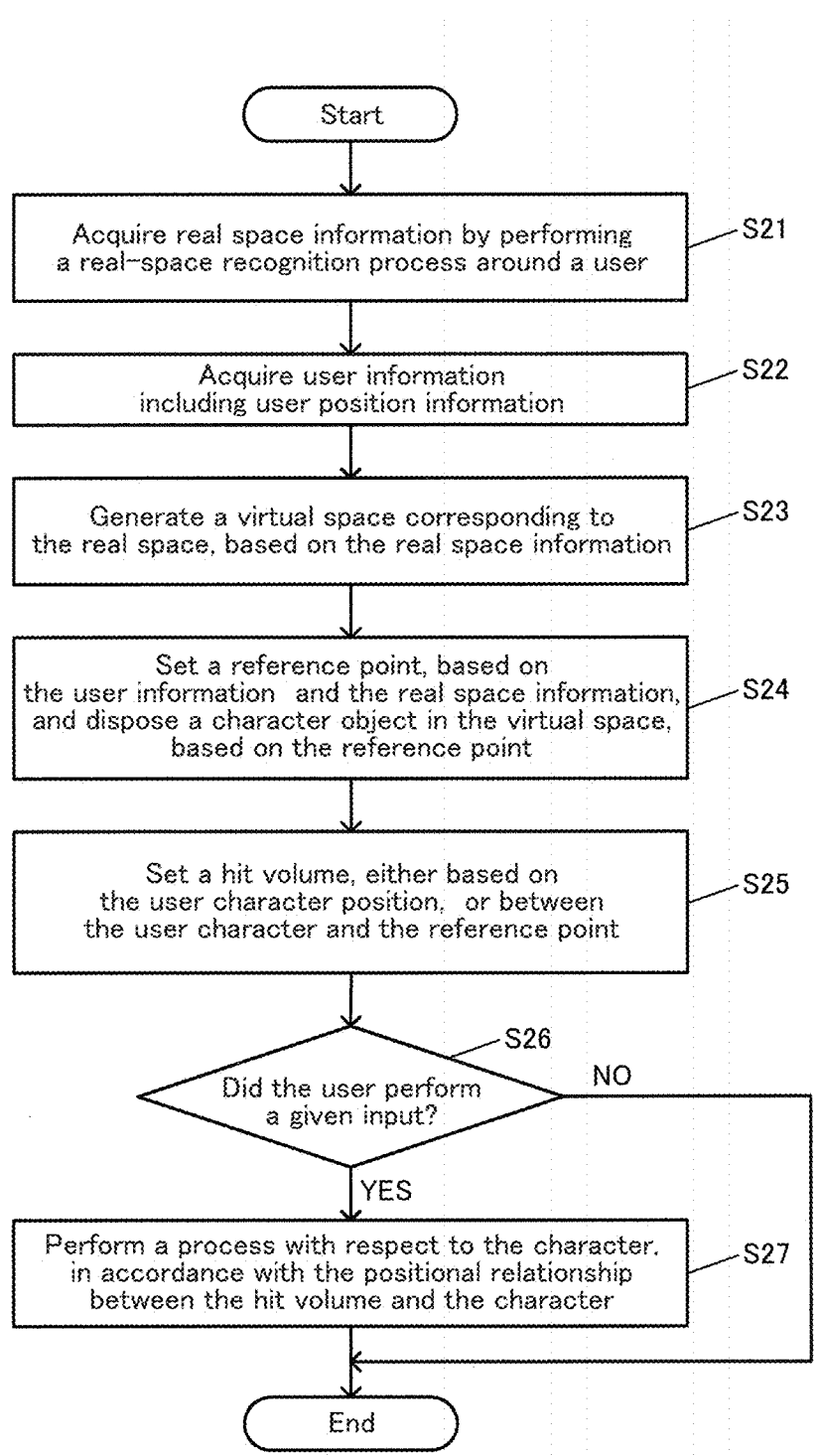
FIG. 26 is a flow chart showing an example of a detailed process according to the present embodiment.

Next, an example of the detailed process according to the present embodiment is described with reference to the flowchart in FIG. 26.

First, real space information is acquired by performing a process of recognizing the real space around the user (step S21). Specifically a process of scanning the real space described with reference to FIGS. 4A and 4B is performed, and the acquired real space information is accumulated in the real space information storage section 171 of FIG. 1. Further, the user information including position information of the user is acquired (step S22). For example, user information including the position information of the user, the direction information of the user, the posture information of the user, and the like is acquired by the HMD 200 tracking process or the like described with reference to FIGS. 2 and 3.

Next, a virtual space corresponding to the real space is generated based on the acquired real space information (step S23). For example, a virtual object corresponding to an object (a desk, a wall, or the like) in the real space as shown in FIG. 4B is generated and disposed in the virtual space. Then, a reference point is set based on the user information and the real space information, and the object of the character is disposed in the virtual space based on the reference point (step S24). For example, the reference point RP is set as shown in FIG. 7B, and the character CH is disposed and made to appear at a position that is set with respect to the reference point RP as shown in FIGS. 8A and 8B.

Figure 20B:
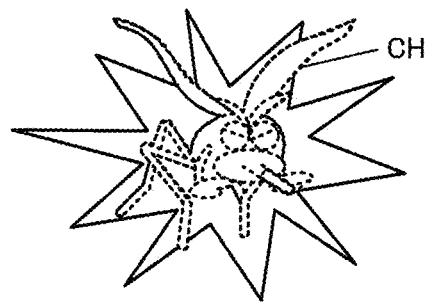
Figure 20B:
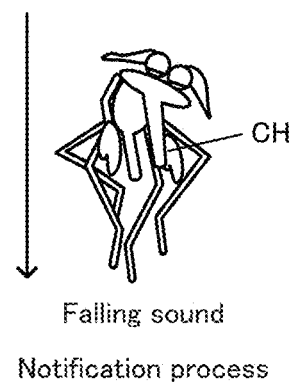

Next, a hit volume is set, either based on the position of the user character, or between the user character and the reference point (step S25). For example, as shown in FIG. 17A, the hit volume HV is set based on the position PS of the user character USC. Alternatively, as shown in FIG. 19A, the hit volume HV is set between the user character USC and the reference point RP. Then, it is determined whether or not the user has performed a given input (step S26). For example, it is determined whether or not an input by a hand clapping action described in FIGS. 9A to 11B is performed. Then, a process with respect to the character is performed according to the positional relationship between the hit volume and the character (step S27). For example, when it is determined that the character CH is positioned within the hit volume HV as described with reference to FIGS. 17A, 17B, 19A, and 19B, or when it is determined that the hit volume HV and the second hit volume that is set for the character CH cross each other, an eliminating process, a destroying process, a display mode changing process, a notification process, or the like of the character CH as described with reference to FIGS. 20A and 20B is executed.

In accordance with one of some embodiments, it is possible to provide a simulation system, a processing method, an information storage medium, and the like capable of suitable interaction between a user and a character by effectively utilizing real space information.

One of the present embodiments relates to a simulation system comprising a processor including hardware, the processor being configured to perform: an information acquisition process that acquires real space information obtainable by performing a recognition process of a real space around a user, and user information including position information of the user; a virtual space generation process that generates a virtual space corresponding to the real space based on the real space information; an object process that sets a reference point in the virtual space based on the user information and the real space information, and that disposes an object of a character in the virtual space based on the reference point; and a display process that displays an image including an image of the character in a display section, in the object process, the processor being configured to set a hit volume based on a position of a user moving body in the virtual space corresponding to the user, and perform a process with respect to the character in accordance with a positional relationship between the hit volume and the character when the user performs a given input.

In accordance with one of some embodiments, real space information is acquired by performing a recognition process of the real space around the user, and a virtual space corresponding to the real space is generated based on the real space information. Further, a reference point is set based on the real space information, and an object of a character is disposed in the virtual space based on the reference point. Then, a hit volume is set based on the position of the user moving body in the virtual space, and, when the user performs a given input, a process with respect to the character is performed in accordance with the positional relationship between the hit volume and the character. Therefore, it becomes possible to set a virtual space corresponding to the real space and dispose the character, and to thereby realize interaction with the character based on the input by the user. This makes it possible to achieve a simulation system or the like capable of suitable interaction between the user and the character by effectively utilizing real space information.

In accordance with one of some embodiments, the hit volume may be a hit volume that is set with respect to a body part of the user or belongings of the user.

In this way, by setting the hit volume with respect to a body part or belongings of the user, when the user moves the body part or the belongings in the real space, the hit volume moves in linkage with the body part or the belongings, thereby improving virtual reality of the user.

In accordance with one of some embodiments, there is provided the simulation system, wherein, in the object process, the processor may perform, in case that the user moving body and the reference point have a first distance relationship, setting of the hit volume based on a position of the user moving body, and execution of a process with respect to the character in accordance with the positional relationship between the hit volume and the character when the user performs the given input, and in case that the user moving body and the reference point have a second distance relationship, setting of the hit volume between the user moving body and the reference point, and execution of the process with respect to the character in accordance with the positional relationship between the hit volume and the character when the user performs the given input.

This arrangement makes it possible to set an appropriate hit volume in accordance with the distance relationship between the user moving body and the reference point, and, when the user performs a given input, it is possible to determine the positional relationship between the hit volume and the character, thus performing a process with respect to the character.

Further, one of the present embodiments relates to a simulation system comprising a processor including hardware, the processor being configured to perform: an information acquisition process that acquires real space information obtainable by performing a recognition process of a real space around a user and user information including position information of the user; a virtual space generation process that generates a virtual space corresponding to the real space based on the real space information; an object process that sets a reference point in the virtual space based on the user information and the real space information, and that disposes an object of a character in the virtual space based on the reference point; and a display process that displays an image including an image of the character in a display section, in the object process, the processor being configured to set a hit volume between the reference point and a user moving body in the virtual space corresponding to the user, and perform a process with respect to the character in accordance with a positional relationship between the hit volume and the character, when the user performs a given input.

In accordance with one of some embodiments, real space information is acquired by performing a recognition process of the real space around the user, and a virtual space corresponding to the real space is generated based on the real space information. Further, a reference point is set based on the real space information, and an object of a character is disposed in the virtual space based on the reference point. Then, a hit volume is set between the reference point and the user moving body in the virtual space, and, when the user performs a given input, a process with respect to the character is performed in accordance with the positional relationship between the hit volume and the character. Therefore, it becomes possible to set a virtual space corresponding to the real space and dispose the character, and to thereby realize interaction with the character based on the input by the user. As a result, it is possible to provide a simulation system or the like that is capable of achieving a suitable interaction between the user and the character by effectively utilizing real space information.

In accordance with one of some embodiments, there is provided the simulation system, wherein, in the object process, the processor may determine whether or not the user has performed the given input based on information from a detection section that detects a movement of the user.

This arrangement makes it possible to determine whether or not the user has performed a given input by detecting a movement of the user in the real space, thus enabling a process using a hit volume.

In accordance with one of some embodiments, there is provided the simulation system, wherein, in the object process, the processor may perform, as the process with respect to the character, a process of eliminating the character, a process of destroying the character, a process of changing a display mode of the character, or a notification process regarding the character.

This arrangement makes it possible to eliminate the character, destroy the character, change a display mode of the character, or perform a notification process regarding the character in accordance with the positional relationship between the hit volume and the character when the user performs a given input.

In accordance with one of some embodiments, there is provided the simulation system, wherein, in the object process, the processor may determine a disposition timing of the character in accordance with a distance between the user moving body and the reference point.

This arrangement makes it possible to reflect the distance relationship between the user moving body and the reference point in disposing a character corresponding to the reference point.

In accordance with one of some embodiments, there is provided the simulation system, wherein, in the object process, the processor may set the reference point in accordance with information of a situation of the user, information of a situation of the user moving body, information of a situation or type of the character, or information of a game situation.

This arrangement makes it possible to set an appropriate reference point according to the situation of the user, the situation of the user moving body, the situation of the character, or the game situation.

In accordance with one of some embodiments, there is provided the simulation system, wherein,
in the information acquisition process, the processor may acquire environment information in the real space, and, in the object process, the processor may set the reference point in accordance with the environment information.

This arrangement makes it possible to set an appropriate reference point that reflects the situation of the environment in the real space.

In accordance with one of some embodiments, there is provided the simulation system, wherein, in the object process, the processor may change the hit volume in accordance with a position of the reference point.

This arrangement makes it possible to set an appropriate hit volume in accordance with the reference point.

In accordance with one of some embodiments, there is provided the simulation system, wherein in the object process, the processor may change the hit volume in accordance with information of a situation of the user, information of a situation of the user moving body, information of a situation or type of the character, or information of a game situation.

This arrangement makes it possible to set an appropriate hit volume in accordance with the situation of the user, the situation of the user moving body, the situation or type of the character, or the game situation.

One of the present embodiments relates to a processing method comprising: performing an information acquisition process that acquires real space information obtainable by performing a recognition process of a real space around a user and user information including position information of the user; performing a virtual space generation process that generates a virtual space corresponding to the real space based on the real space information; performing an object process that sets a reference point in the virtual space based on the user information and the real space information, and that disposes an object of a character in the virtual space based on the reference point; performing a display process that displays an image including an image of the character in a display section; and in the object process, setting a hit volume based on a position of a user moving body in the virtual space corresponding to the user, and performing a process with respect to the character in accordance with a positional relationship between the hit volume and the character when the user performs a given input.

One of the present embodiments relates to a processing method comprising: performing an information acquisition process that acquires real space information obtainable by performing a recognition process of a real space around a user and user information including position information of the user; performing a virtual space generation process that generates a virtual space corresponding to the real space based on the real space information; performing an object process that sets a reference point in the virtual space based on the user information and the real space information, and that disposes an object of a character in the virtual space based on the reference point; performing a display process that displays an image including an image of the character in a display section; and in the object process, setting a hit volume between the reference point and a user moving body in the virtual space corresponding to the user, and performing a process with respect to the character in accordance with a positional relationship between the hit volume and the character when the user performs a given input.

One of the present embodiments relates to a computer-readable information storage medium storing a program for causing a computer to perform the above processing method.

Although the present embodiments have been described in detail above, those skilled in the art will readily appreciate that many modifications are possible in the embodiment without materially departing from the novel teachings and advantages of the present disclosure. Accordingly, all such modifications are intended to be included within the scope of the present disclosure. For example, in the specification or the drawings, each of terms (such as user character, or arm sensor) that is at least once used together with another broader-sense or synonymous term (such as user moving body, or detection section) can be replaced with the other term at any part of the specification or the drawings. The various processes described herein, such as the process of acquiring the real space information or user information, the process of generating the virtual space, the process of setting the reference point, the process of disposing the character, the process of setting the hit volume, and the process of determining the positional relationship, are not limited to those described in the present embodiment; and other methods, processes and configurations equivalent thereto are also included within the scope of the present disclosure. Further, the embodiments can be applied to various games. Furthermore, the embodiments can be applied to various simulation systems such as an arcade game apparatus, a consumer game apparatus, a large attraction system where many users participate in the game, and the like.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A simulation system comprising a processor including hardware,
    the processor being configured to perform:
    an information acquisition process that acquires real space information obtainable by performing a recognition process of a real space around a user, and user information including position information of the user;
    a virtual space generation process that generates a virtual space corresponding to the real space based on the real space information;
    an object process that sets a reference point in the virtual space based on the user information and the real space information, and that disposes an object of a character in the virtual space based on the reference point; and
    a display process that displays an image including an image of the character in a display section,
    in the object process, the processor being configured to set a hit volume based on a position of a user moving body in the virtual space corresponding to the user, and/or set the hit volume between the reference point and the user moving body in the virtual space corresponding to the user,
    perform a process with respect to the character in accordance with a positional relationship between the hit volume and the character when the user performs a given input,
    wherein, in the object process, the processor is configured to perform at least one of:
    as the process with respect to the character, a process of eliminating the character, a process of destroying the character, a process of changing a display mode of the character, or a notification process regarding the character;
    determines a disposition timing of the character in accordance with a distance between the user moving body and the reference point; and/or
    changes the hit volume in accordance with a position of the reference point, and/or in accordance with information of a situation of the user, information of a situation of the user moving body, information of a situation or type of the character, or information of a game situation.

2. The simulation system as defined in claim 1, wherein the hit volume is a hit volume that is set with respect to a body part of the user or belongings of the user.

3. The simulation system as defined in claim 1, wherein, in the object process, the processor determines whether or not the user has performed the given input based on information from a detection section that detects a movement of the user.

4. The simulation system as defined in claim 1, wherein, in the object process, the processor sets the reference point in accordance with information of the situation of the user, information of the situation of the user moving body, information of the situation or type of the character, or information of the game situation.

5. The simulation system as defined in claim 1, wherein, in the information acquisition process, the processor acquires environment information in the real space, and, in the object process, the processor sets the reference point in accordance with the environment information.

6. A simulation system comprising a processor including hardware,
the processor being configured to perform:
an information acquisition process that acquires real space information obtainable by performing a recognition process of a real space around a user, and user information including position information of the user;
a virtual space generation process that generates a virtual space corresponding to the real space based on the real space information;
an object process that sets a reference point in the virtual space based on the user information and the real space information, and that disposes an object of a character in the virtual space based on the reference point; and
a display process that displays an image including an image of the character in a display section,
in the object process, the processor being configured to
set a hit volume based on a position of a user moving body in the virtual space corresponding to the user, and/or set the hit volume between the reference point and the user moving body in the virtual space corresponding to the user,
perform a process with respect to the character in accordance with a positional relationship between the hit volume and the character when the user performs a given input,
wherein,
in the object process, the processor performs,
in case that the user moving body and the reference point have a first distance relationship, setting of the hit volume based on a position of the user moving body, and execution of a process with respect to the character in accordance with the positional relationship between the hit volume and the character when the user performs the given input, and
in case that the user moving body and the reference point have a second distance relationship, setting of the hit volume between the user moving body and the reference point, and execution of the process with respect to the character in accordance with the positional relationship between the hit volume and the character when the user performs the given input.

7. A processing method comprising:
performing an information acquisition process that acquires real space information obtainable by performing a recognition process of a real space around a user and user information including position information of the user;
performing a virtual space generation process that generates a virtual space corresponding to the real space based on the real space information;
performing an object process that sets a reference point in the virtual space based on the user information and the real space information, and that disposes an object of a character in the virtual space based on the reference point;
performing a display process that displays an image including an image of the character in a display section; and
in the object process,
setting a hit volume based on a position of a user moving body in the virtual space corresponding to the user, and/or setting the hit volume between the reference point and the user moving body in the virtual space corresponding to the user, and
performing a process with respect to the character in accordance with a positional relationship between the hit volume and the character when the user performs a given input,
wherein, the object process comprises at least one of:
as the process with respect to the character, a process of eliminating the character, a process of destroying the character, a process of changing a display mode of the character, or a notification process regarding the character;
determining a disposition timing of the character in accordance with a distance between the user moving body and the reference point; and/or
changing the hit volume in accordance with a position of the reference point, and/or in accordance with information of a situation of the user, information of a situation of the user moving body, information of a situation or type of the character, or information of a game situation.

8. The processing method as defined in claim 7, further comprising,
in the object process, determining whether or not the user has performed the given input based on information from a detection section that detects a movement of the user.

9. The processing method as defined in claim 7, further comprising,
in the information acquisition process, acquiring environment information in the real space, and
in the object process, setting the reference point in accordance with the environment information.

10. A non-transitory computer-readable information storage medium storing a program for causing a computer to perform the processing method as defined in claim 7.

11. The processing method as defined in claim 7, wherein the hit volume is a hit volume that is set with respect to a body part of the user or belongings of the user.

12. The processing method as defined in claim 7, further comprising,
in the object process, the processor sets the reference point in accordance with information of the situation of the user, information of the situation of the user moving body, information of the situation or type of the character, or information of the game situation.

13. A processing method comprising:
performing an information acquisition process that acquires real space information obtainable by performing a recognition process of a real space around a user and user information including position information of the user;

performing a virtual space generation process that generates a virtual space corresponding to the real space based on the real space information;

performing an object process that sets a reference point in the virtual space based on the user information and the real space information, and that disposes an object of a character in the virtual space based on the reference point;

performing a display process that displays an image including an image of the character in a display section; and in the object process, setting a hit volume based on a position of a user moving body in the virtual space corresponding to the user, and/or setting the hit volume between the reference point and the user moving body in the virtual space corresponding to the user, and performing a process with respect to the character in accordance with a positional relationship between the hit volume and the character when the user performs a given input, wherein, the object process comprises in case that the user moving body and the reference point have a first distance relationship, setting of the hit volume based on a position of the user moving body, and executing a process with respect to the character in accordance with the positional relationship between the hit volume and the character when the user performs the given input, and in case that the user moving body and the reference point have a second distance relationship, setting of the hit volume between the user moving body and the reference point, and executing the process with respect to the character in accordance with the positional relationship between the hit volume and the character when the user performs the given input.

14. A non-transitory computer-readable information storage medium storing a program for causing a computer to perform the processing method as defined in claim 13.

\* \* \* \* \*